(12) United States Patent
Masias et al.

(10) Patent No.: US 12,516,749 B2
(45) Date of Patent: Jan. 6, 2026

(54) VALVE HANDLES AND DUAL-VALVE ASSEMBLIES HAVING VALVE HANDLES

(71) Applicant: Emerson Process Management Regulator Technologies, Inc., Mckinney, TX (US)

(72) Inventors: Justin Masias, McKinney, TX (US); Steven Landry Peek, Denison, TX (US)

(73) Assignee: Emerson Process Management Regulator Technologies, Inc., McKinney, TX (US)

(*) Notice: Subject to any disclaimer, the term of this patent is extended or adjusted under 35 U.S.C. 154(b) by 15 days.

(21) Appl. No.: 18/523,415

(22) Filed: Nov. 29, 2023

(65) Prior Publication Data

US 2024/0093802 A1  Mar. 21, 2024

Related U.S. Application Data

(62) Division of application No. 17/726,035, filed on Apr. 21, 2022, now Pat. No. 11,835,151.

(51) Int. Cl.
*F16K 35/14* (2006.01)

(52) U.S. Cl.
CPC .................. *F16K 35/14* (2013.01)

(58) Field of Classification Search
CPC ........................................................ F16K 35/14
See application file for complete search history.

(56) References Cited

U.S. PATENT DOCUMENTS

| 746,896 A * | 12/1903 | Stott .................. F16K 11/20 |
| | | 137/637.1 |
| 2,173,210 A | 9/1939 | Lieb et al. |
| 2,274,731 A * | 3/1942 | Parker .................. F16K 5/184 |
| | | 251/182 |
| 9,841,769 B2 | 12/2017 | Hurst |
| 11,691,164 B2 | 7/2023 | Loukusa et al. |
| 11,835,151 B2 * | 12/2023 | Masias .................. F16K 35/06 |

(Continued)

FOREIGN PATENT DOCUMENTS

CN  111419364 A  7/2020

OTHER PUBLICATIONS

International Searching Authority, "Written Opinion," issued in connection with International Patent Application No. PCT/US23/14948, mailed on Aug. 10, 2023, 4 pages.

(Continued)

*Primary Examiner* — Vicky A Johnson
(74) *Attorney, Agent, or Firm* — Hanley, Flight & Zimmerman, LLC

(57) ABSTRACT

Valve handles and dual-valve assemblies having handles are disclosed herein. An example dual-valve assembly includes a first valve having a first shaft. The first valve has a plate with a notch. The dual-valve assembly also includes a second valve having a second shaft. The dual-valve assembly further includes a handle coupled to the first and second shafts, such that when the handle is rotated, the first and second shafts are rotated simultaneously. The handle includes a body and a flexible arm coupled to and extending from the body. The flexible arm has a lock edge sized to fit within the notch to limit rotation of the handle relative to the first and second valves.

17 Claims, 17 Drawing Sheets

(56) References Cited

U.S. PATENT DOCUMENTS

2014/0036013 A1  2/2014  Jon

OTHER PUBLICATIONS

Emerson Process Management, "Type 63EGLP Relief Valve," Instruction Manual D450319T012, Sep. 2016, 16 pages.
International Searching Authority, "Invitation to Pay Additional Fees," issued in connection with International Patent Application No. PCT/US2023/14948 dated May 31, 2023, 2 pages.
United States Patent and Trademark Office, "Requirement for Restriction / Election" issued in U.S. Appl. No. 17/726,035 on Jun. 1, 2023 (9 pages).
United States Patent and Trademark Office, "Notice of Allowance" issued in U.S. Appl. No. 17/726,035 on Sep. 26, 2023 (2 pages).
United States Patent and Trademark Office, "Notice of Allowance and Fee(s) Due," issued in connection with U.S. Appl. No. 17/726,035, dated Jul. 26, 2023, 9 pages.
International Searching Authority, "International Search Report" issued in connection with International Patent Application No. PCT/US23/14948, mailed on Aug. 10, 2023, 4 pages.

* cited by examiner

2000

2002

PRINT, VIA A 3D PRINTER, A HANDLE ON A SUBSTRATE

2004

REMOVE THE HANDLE FROM THE SUBSTRATE

Fig. 20

VALVE HANDLES AND DUAL-VALVE ASSEMBLIES HAVING VALVE HANDLES

RELATED APPLICATION

This patent arises from a divisional of U.S. patent application Ser. No. 17/726,035 (now U.S. Pat. No. 11,835,151), titled "Valve Handles and Dual-Valve Assemblies Having Valve Handles," which was filed on Apr. 21, 2022. U.S. patent application Ser. No. 17/726,035 is hereby incorporated herein by reference in its entirety. Priority to U.S. patent application Ser. No. 17/726,035 is hereby claimed.

FIELD OF THE DISCLOSURE

This disclosure relates generally to valves and, more specifically, to valve handles and dual-valve assemblies having valve handles.

BACKGROUND

Valves and other process control devices are commonly used to control the flow of fluids (e.g., waster, oil, natural gas, etc.). Some valve assemblies include two valves that are to be operated simultaneously, such that when one valve is closed the other valve is opened, and vice versa. A single handle is typically coupled to both valves that can be used to operate both valves at the same time.

SUMMARY

An example dual-valve assembly disclosed herein includes a first valve having a first shaft. The first valve has a plate with a notch. The dual-valve assembly also includes a second valve having a second shaft. The dual-valve assembly further includes a handle coupled to the first and second shafts, such that when the handle is rotated, the first and second shafts are rotated simultaneously. The handle includes a body and a flexible arm coupled to and extending from the body. The flexible arm has a lock edge sized to fit within the notch to limit rotation of the handle relative to the first and second valves.

An example handle disclosed herein includes a body having a first end and a second end opposite the first end. The first end has a first tab with a first opening and a second tab with a second opening. Each of the first and second openings is configured to receive a rotatable component. The handle also includes a flexible arm coupled to and extending from the body. The flexible arm has a first portion and a second portion. The first portion has a first end and a second end opposite the first end. The first end of the first portion is connected to the second portion by a bend. The bend sized to fit within a notch to prevent rotation of the handle. When the second end of the first portion is moved toward the body, the bend of the flexible arm is pivoted away from the body to permit rotation of the handle.

An example method disclosed herein includes printing, via a three-dimensional (3D) printer, a handle. The handle includes a body having a first end and a second end opposite the first end. The first end has a first tab with a first opening and a second tab with a second opening. Each of the first and second openings is configured to receive a rotatable component. The handle also includes a flexible arm extending from the body. The flexible arm has a first portion and a second portion. The first portion has a first end and a second end opposite the first end. The first end of the first portion is connected to the second portion by a bend. The bend is sized to fit within a notch to prevent rotation of the handle. When the second end of the first portion is moved toward the body, the bend of the flexible arm is pivoted away from the body to permit rotation of the handle.

BRIEF DESCRIPTION OF THE DRAWINGS

FIG. 7 shows an example flexible arm of the example handle in a neutral position.

FIG. 20 is a flowchart representative of an example method of manufacturing an example handle and/or an example handle assembly.

In general, the same reference numbers will be used throughout the drawing(s) and accompanying written description to refer to the same or like parts. The figures are not to scale.

Figure 1:
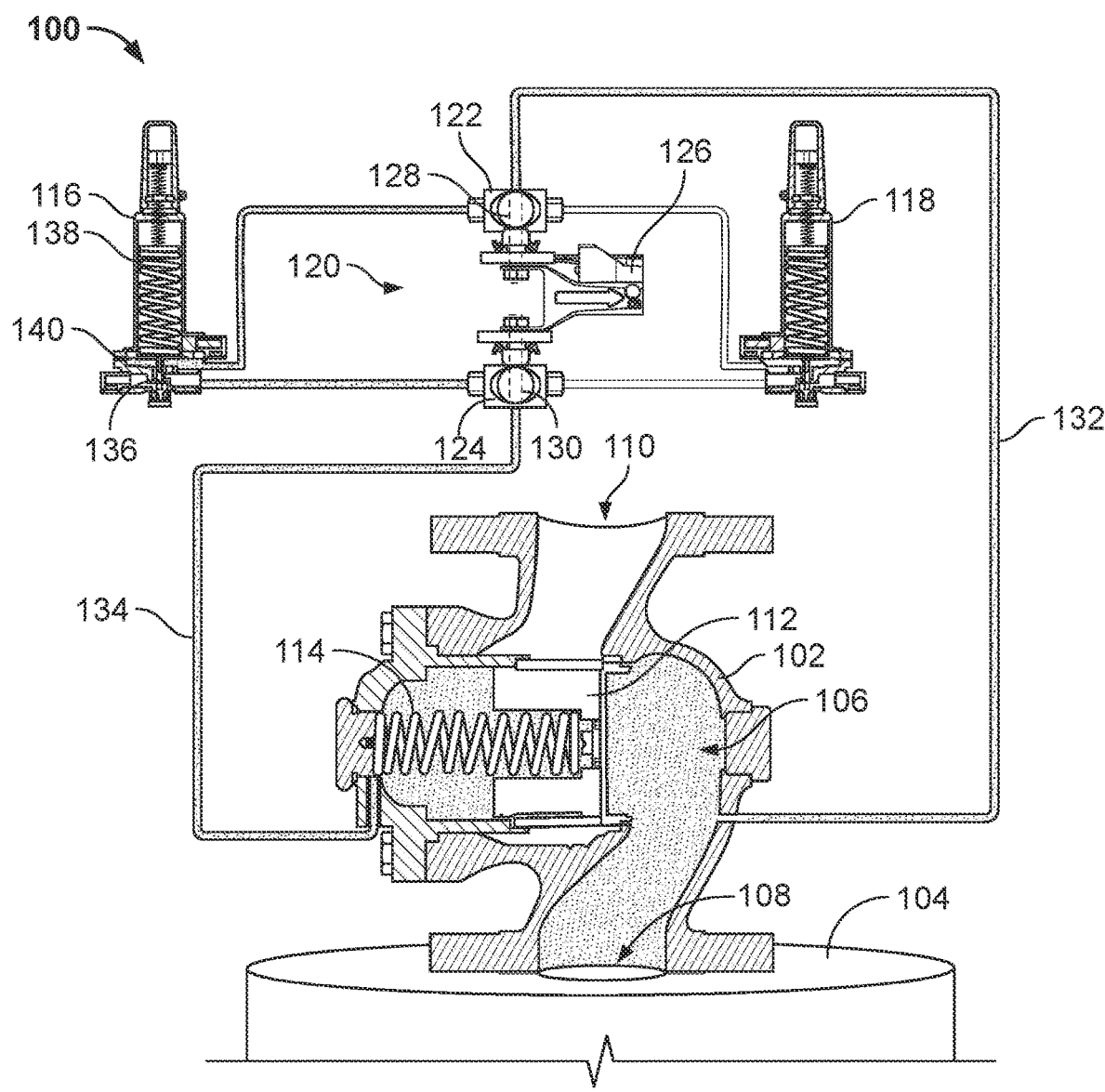
FIG. 1 is a schematic of an example pressure relief system with an example dual-valve assembly including an example handle. The example handle is shown in a first position.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

DETAILED DESCRIPTION

Process control devices, such as valves, are commonly used to control the flow of fluids. Some valves or systems of valves include two valves that are to be operated simultaneously, referred to herein as dual-valve assembly or dual-valve system. For example, a dual-valve assembly can include a first valve having a first shaft that can be rotated to change the state of the first valve (e.g., between an open and closed state) and a second valve having a second shaft that can be rotated to change the state of the second valve. The first and second valves may be, for example, ball valves. In some examples, the dual-valve assembly includes a handle that is disposed between and coupled to the first and second valves. In particular, the handle is coupled to both the first and second shafts of the first and second valves. Therefore, when the handle is rotated, the valves are operated (e.g., moved to another position, opened, closed, etc.) simultaneously. In some examples, the valves are 3-way ball valves that fluidly couple a relief valve to a first pilot and/or a second pilot based on the position of the handle. For example, when the handle is in a first position, the valves are in a first state that fluidly couples the relief valve to the first pilot. When the handle is rotated (e.g., 180°) to a second position, the valves are in a second state that fluidly couples the relief valve to the second pilot. In some examples, the handle can be rotated to a third position (e.g., between the first and second positions), where the valves are operated in a third state that fluidly couples the relief valve to both pilots. In other examples, the valves may be other types of valves and/or arranged in other configurations. For example, the dual-valve assembly may be configured such that the valves are in opposite states. For example, when the first valve is in a closed state, the second valve is in an open state. When the handle is rotated (e.g., 180°), the first valve is opened and the second valve is closed. In other examples, the dual-valve assembly can be configured such that the first and second valves are in the same state.

Disclosed herein are example valve handles and handle assemblies for use with dual-valve assemblies and example methods of making such example handles. The example handles disclosed herein can be constructed shorter than known handles, which enables the example handles to be used in smaller, more compact systems. The example handles disclosed herein also include lockout features, which enables the handle to be locked in certain positions relative to the first and second valves. The example handles disclosed herein are easier and less expensive to manufacture than known handles.

Some example handles and handle assemblies disclosed herein are formed via an additive manufacturing process, sometimes referred to as three-dimensional (3D) printing. As used herein, additive manufacturing or 3D printing refers to a manufacturing process that forms an object by adding successive adjacent layers of material (e.g., a same material). The layers are fused or bonded together (e.g., naturally or via a subsequent fusing process) to form the object. The material may be any material, such as metal, plastic, concrete, etc. Examples of additive manufacturing include Stereolithography (SLA), Selective Laser Sintering (SLS), fused deposition modeling (FDM), and multi-jet modeling (MJM). 3D printing is advantageous because it results in less wasted material than known machining operations. Therefore, 3D printing the example handles results in relatively low cost handles and handle assemblies. Further, 3D printing results in superior tolerances compared to many other known manufacturing techniques.

Turning now to the figures, FIG. 1 is a schematic of an example pressure relief apparatus or system 100 in which the example handles and handle assemblies disclosed herein can be implemented. In the illustrated example, the pressure relief system 100 includes a relief valve 102. In the illustrated example, the relief valve 102 is fluidly coupled to a fluid container 104 (e.g., a storage tank). The relief valve 102 is configured to vent or relieve pressure (e.g., gas) from the fluid container 104. For example, the fluid container 104 may be filled with a volatile or combustible fluid, such as liquified petroleum gas or propane. If vapor pressure builds up in the fluid container 104 (e.g., due to rising atmospheric temperatures), the relief valve 102 opens to relieve/vent the vapor from the fluid container 104.

In the illustrated example, the relief valve 102 has a passageway 106 between an inlet 108 and an outlet 110. The inlet 108 is in fluid communication with the fluid container 104, and the outlet 110 is vented to the atmosphere. The relief valve 102 includes a flow control member 112, referred to herein as a valve plug 112, disposed in the passageway 106. The valve plug 112 is moveable between a closed position (the position shown in FIG. 1) and an open position. In the closed position, the valve plug 112 prevents fluid from flowing through the passageway 106 to the outlet 110. In the open position, the valve plug 112 allows the fluid to flow through the passageway 106 to the outlet 110. The valve plug 112 typically remains in the closed position, until the pressure in the fluid container 104 reaches a set pressure (e.g., a threshold pressure), at which point the valve plug 112 moves to the open position to vent the vapor pressure in the fluid container 104. In the illustrated example, the relief valve 102 has a control spring 114 that biases the valve plug 112 to the closed position.

In the illustrated example, the pressure relief system 100 includes a first pilot 116 and a second pilot 118, sometimes referred to as a dual-pilot assembly. The pilots 116, 118 may be implemented as pressure regulators. In general, during operation of the pressure relief system 100, one of the pilots is active, while the other pilot is inactive (sometimes referred to as offline or in standby). The active pilot controls operation of the relief valve 102, as disclosed in further detail herein. In the configuration shown in FIG. 1, the first pilot 116 is active, and the second pilot 118 is inactive. The pilots 116, 118 can be switched between being active and inactive, as disclosed in further detail herein.

In the illustrated example, the pressure relief system 100 includes a dual-valve assembly 120 including a first valve 122, a second valve 124, and an example handle 126. The handle 126 is one example of a handle disclosed herein. Other example handles and handle assemblies are disclosed herein that can be similarly implemented in connection with the dual-valve assembly 120. The handle 126 is coupled to both the first and second valves 122, 124. The handle 126 is used to operate both valves 122, 124 simultaneously. For example, the first valve 122 has a first shaft 128 (shown in broken lines) and the second valve 124 has a second shaft 130 (shown in broken lines). The first shaft 128 is coupled to a flow control member (e.g., a ball, a disk, a plug, etc.) in the first valve 122 and the second shaft 130 is coupled to a second flow member in the second valve 124. The handle 126 is coupled to the first and second shafts 128, 130 (e.g., via nuts). As such, when the handle 126 is rotated, the handle 126 rotates the first and second shafts 128, 130 simultaneously, thereby operating both the valves 122, 124 at the same time. In some examples, the first and second valves 122, 124 are 3-way ball valves. However, in other examples, the first and second valves 122, 124 can be implemented as other types of valves (e.g., butterfly valves, globe valves, etc.).

In the illustrated example, the pressure relief system 100 includes a first fluid line 132 that fluidly couples the inlet pressure of the relief valve 102 to the first valve 122 and a second fluid line 134 that fluidly couples the pressure on the backside of the valve plug 112 to the second valve 124. In the example of FIG. 1, the handle 126 is in a position where the valves 122, 124 fluidly couple the inlet pressure and backside pressure to the first pilot 116. As such, the first pilot 116 is the active pilot. The valves 122, 124 block or prevent fluid to the second pilot 118. As such, the second pilot 118 is inactive.

The first pilot 116 includes a pilot valve plug 136, a pilot control spring 138, and a pilot diaphragm 140. The second pilot 118 includes similar components as the first pilot 116. The active pilot (the first pilot 116) senses the changes in inlet pressure of the relief valve 102. As long as the inlet pressure remains below the set pressure, the flow control member 112 remains in the closed position. In particular, the pilot control spring 138 keeps the pilot valve plug 136 closed. As such, the inlet pressure passes through the active pilot (the first pilot 116) and into the backside of the valve plug 112 and then registers as loading pressure on the top of the valve plug 112. Force from the control spring 114, in addition to the pilot loading pressure, provides a force to keep the valve plug 112 in the closed position.

If the inlet pressure exceeds the set pressure, the pressure on the pilot diaphragm 140 overcomes the pilot control spring 138 and opens the pilot valve plug 136. The active pilot (the first pilot 116) then exhausts the loading pressure from the backside of the valve plug 112. The active pilot (the first pilot 116) continuously exhausts the fluid while the inlet pressure is above the set pressure. The inlet pressure unbalance overcomes the main spring force and opens the valve plug 112. In particular, the valve plug 112 moves to the left in FIG. 1 to the open position, thereby venting the vapor pressure in the fluid container 104.

While the first pilot 116 is active, the second pilot 118 is inactive. This enables an operator (e.g., a human) to perform maintenance or testing on the standby pilot. For example, an operator can remove the second pilot 118, test the second pilot 118 to ensure the second pilot 118 is operating correct, and/or replace the second pilot 118. In this example, the dual-valve assembly 120 is configurated such that that the handle 126 points to the inactive pilot. For instance, in FIG. 1, the handle 126 is pointing toward the second pilot 118. This helps indicate to an operator which pilot can be serviced.

Figure 2:
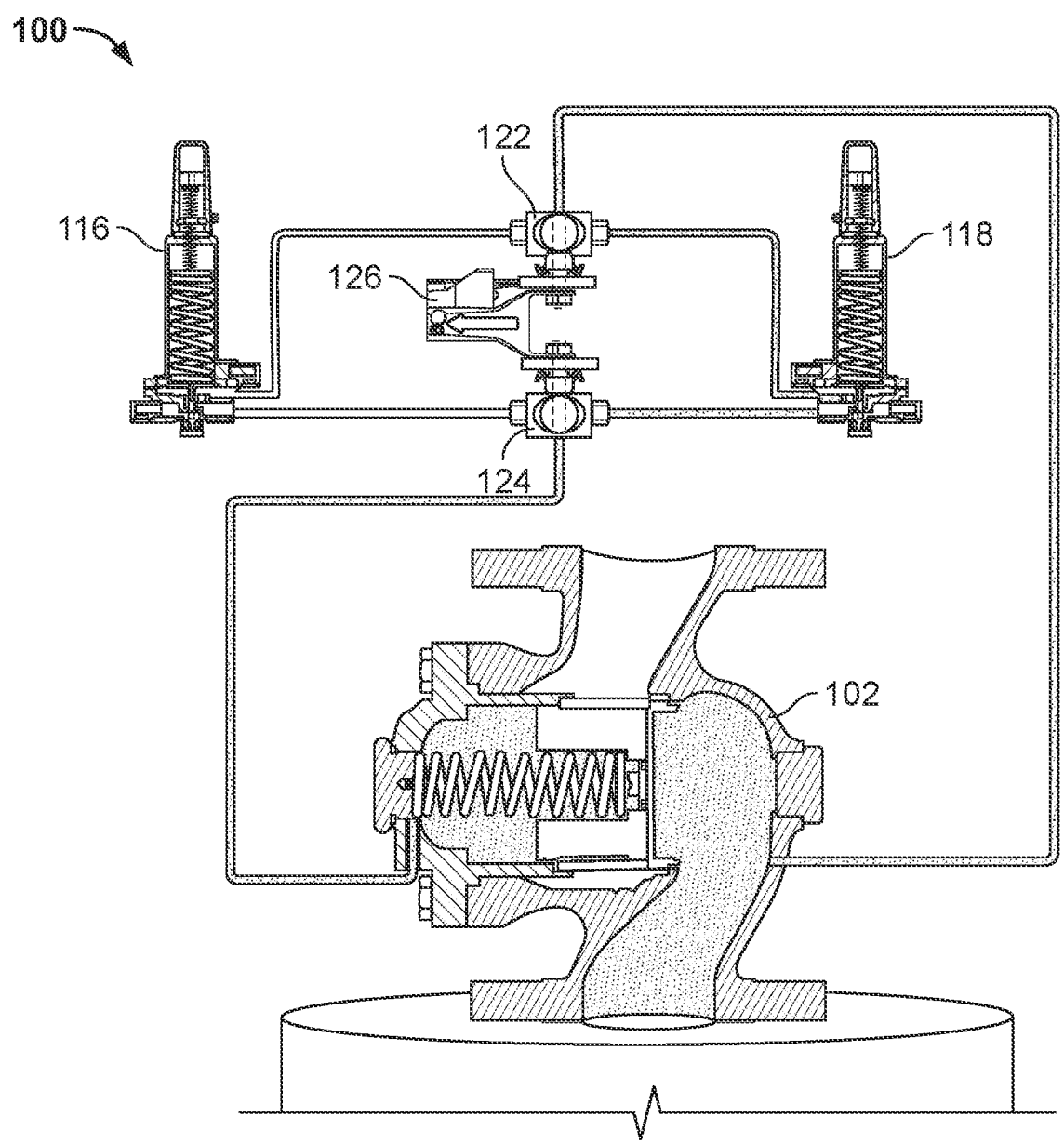
FIG. 2 is the schematic of FIG. 1 showing the example handle in a second position.

To switch which pilot is active and inactive, the handle 126 can be rotated 180° to the position shown in FIG. 2. Rotating the handle 126 controls the valves 122, 124 simultaneously. For example, when the handle 126 is rotated to the position shown in FIG. 2, the valves 122, 124 fluidly couple the inlet and backside pressures to the second pilot 118, and disconnect the first pilot 116 from the inlet and backside pressures. As such, the second pilot 118 becomes the active pilot, and the first pilot 116 is the inactive pilot. The operator can then perform maintenance on the first pilot 116. An operator can move the handle 126 back-and-forth to switch the pilots so that each pilot can be tested. The example configuration is advantageous because one pilot is always active and can maintain control of the relief valve 102. Therefore, the pressure relief system 100 can remain active even while maintenance or testing is performed on the pilots. Accordingly, the pressure relief system 100 does not need to be taken offline. In some examples, the handle 126 can also be moved to a middle position (between the positions shown in FIGS. 1 and 2), in which the valves 122, 124 fluidly couple the inlet and backside pressures to both pilots 116, 118. In that instance, both pilots 116, 118 are active. However, in most applications, only one pilot is active, and the other pilot is inactive.

Figure 3:
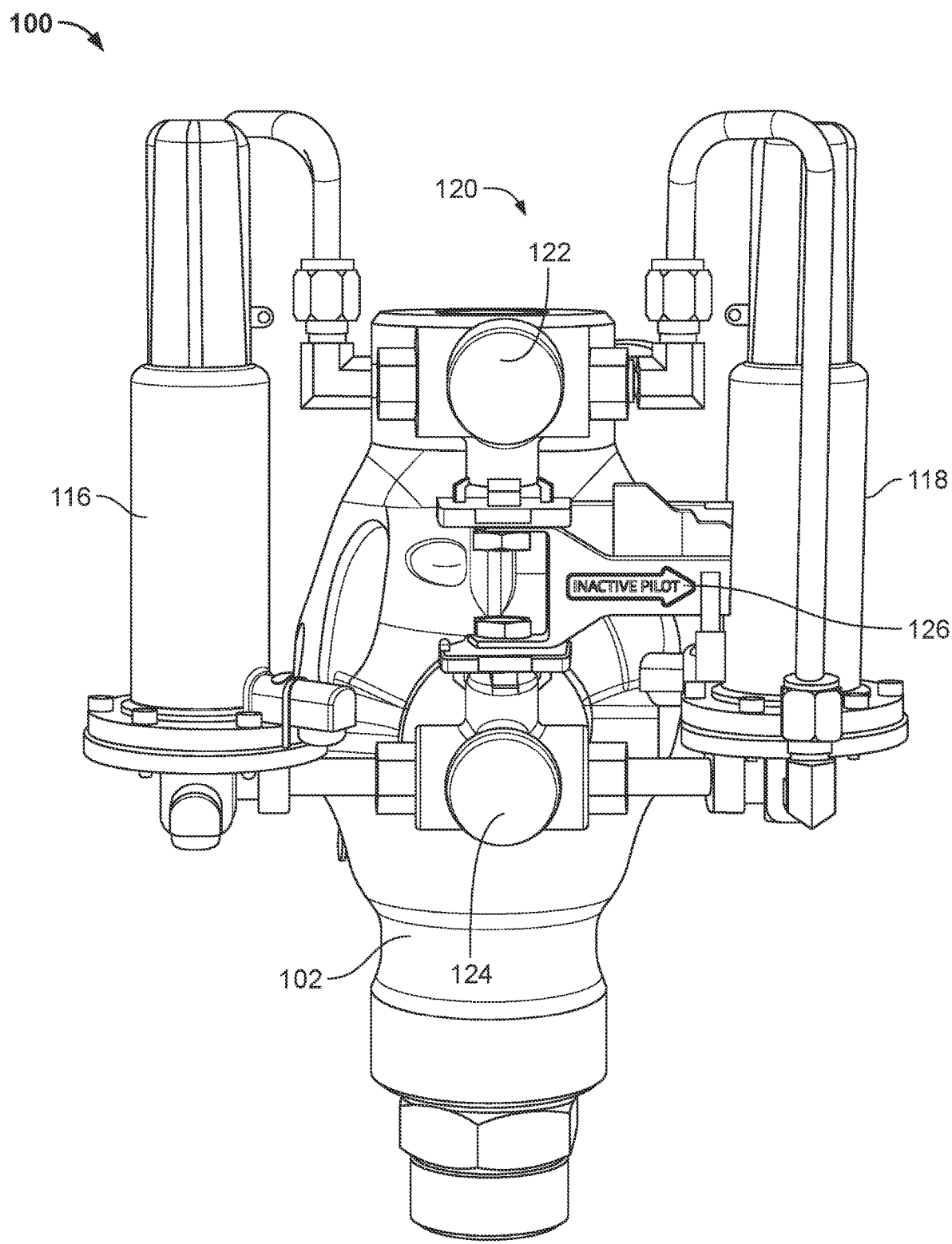
FIG. 3 is a side view of a physical implementation of the example pressure relief system of FIG. 1 showing the example handle.
Figure 4:
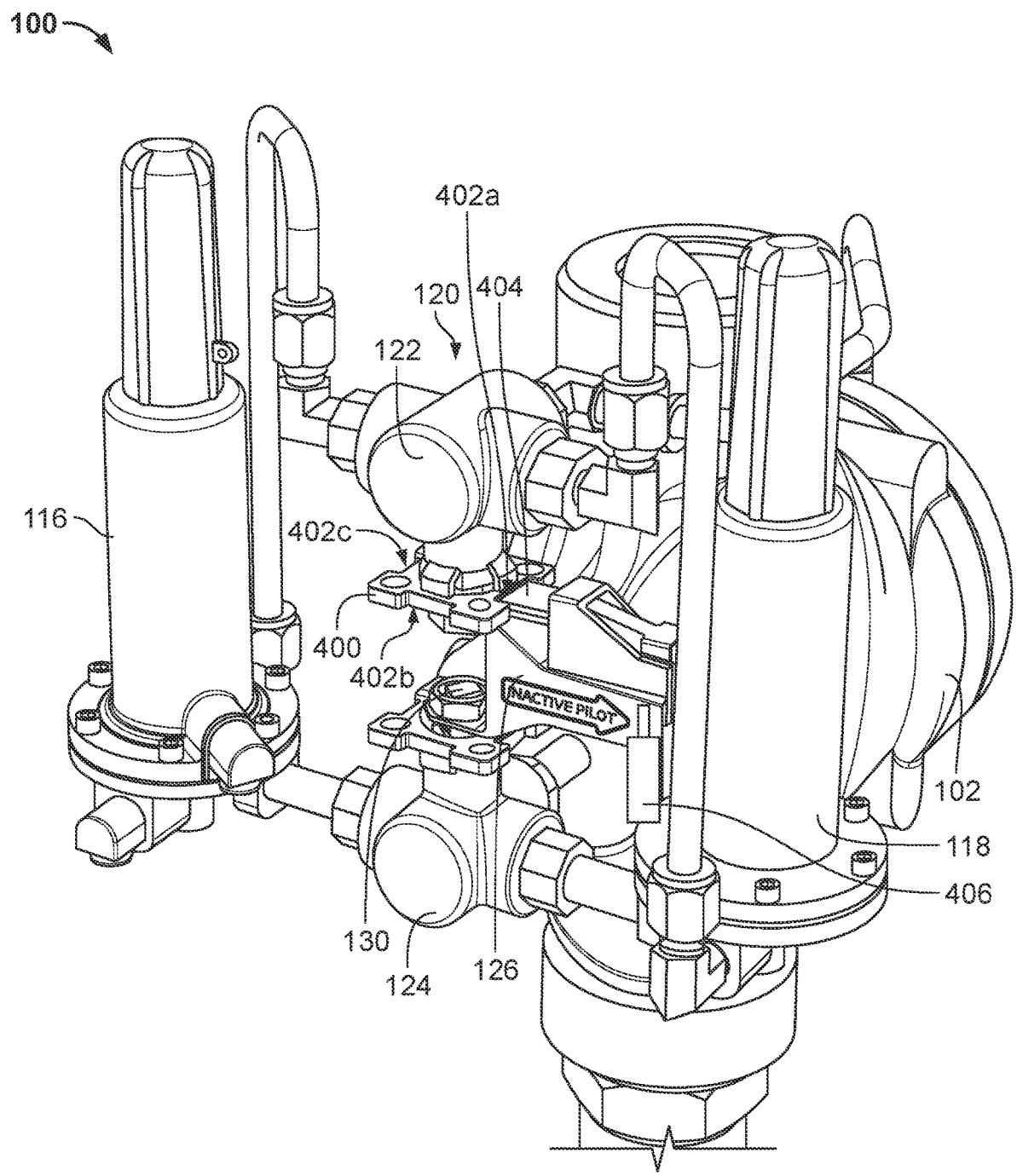
FIG. 4 is a perspective view of the example pressure relief system of FIG. 3.

FIGS. 3 and 4 show an example physical implementation of the example pressure relief system 100, including the example relief valve 102, the example pilots 116, 118, and the example dual-valve assembly 120 including the example valves 122, 124 and the example handle 126. In FIGS. 3 and 4, the handle 126 is pointing to the second pilot 118. As such, the first pilot 116 is the active pilot, and the second pilot 118 is the inactive pilot. The handle 126 can be rotated 180°, such that the handle 126 points to the first pilot 116, to switch the active/inactive pilots. In some examples, the handle 126 can also be rotated 90° (from the current position), such that the handle 126 points away from the relief valve 102, which corresponds to a valve position where both pilots 116, 118 are active. In the illustrated example, the handle 126 is coupled to the first shaft 128 (FIG. 1) of the first valve 122 and the second shaft 130 (FIG. 4) of the second valve 124. Therefore, when the handle 126 is rotated, the handle 126 operates both valves 122, 124 simultaneously. This ensures that one of the pilots 116 118 is always active, so that the pressure relief system 100 remains functional and does not need to be taken offline for maintenance.

As shown in FIG. 4, the first valve 122 has a plate 400. The plate 400 can be part of the valve body of the first valve 122 or can be a separate component coupled to the valve body. In this example, the plate 400 is square-shaped. The plate 400 has one or more notches (e.g., slots, recesses, etc.). For example, as shown in FIG. 4, the plate 400 has first, second, and third notches 402a, 402b, 402c. The notches 402a-402c correspond to the three rotational positions for the handle 126. In the illustrated example, the handle 126 includes a flexible arm 404. The flexible arm 404 can be disposed in certain ones of the notches 402a-402c at certain positions. For example, in the position shown in FIG. 4, the flexible arm 414 is in the first notch 402a. This holds the handle 126 in place and prevents the handle 126 from being rotated. To rotate the handle 126, an operator can move the flexible arm 404 out of the first notch 402a (e.g., by pressing the flexible arm 404) and then rotate the handle 126 to another position and release the flexible arm 404. If the handle 126 is rotated 90° (such that the handle 126 is pointing outward), the flexible arm 414 is disposed in the second notch 402b, which correspond to the middle position in which both pilots 116, 118 are active. If the handle 126 is rotated 180° from the position shown in FIG. 4, the flexible arm 404 is disposed in the third notch 42b, which corresponds to the first pilot 116 being inactive. Therefore, the notches 402a-402c and the flexible arm 404 enable the handle 126 to be held in certain positions corresponding to certain states of the valves 122, 124. In some examples, the second valve 124 includes a similar plate as the first valve 122. However, in this example, the handle 126 only interfaces with the plate 400 of the first valve 122. In other examples, the handle 126 can interface with the plate on the second valve 122.

In some examples, the handle 126 can be locked, which prevents accidental turning of the handle 126. For example, an operator can insert a lock 406 (e.g., a keyed padlock, a combination padlock, etc.) into the handle 126. In some examples, the handle 126 includes a hole or opening to receive a shackle of the lock 406. When the lock 406 is inserted into the handle 126, the lock 406 prevents the flexible arm 404 from moving. This prevents the handle 126 from being moved from the current position until the lock 406 is removed. Additionally or alternatively, a tag can be attached to the handle 126 and/or the lock 406 to indicate certain information, such as the last time the pilots 116, 118 were serviced. This can also be referred to as a lockout-tagout.

Figure 5:
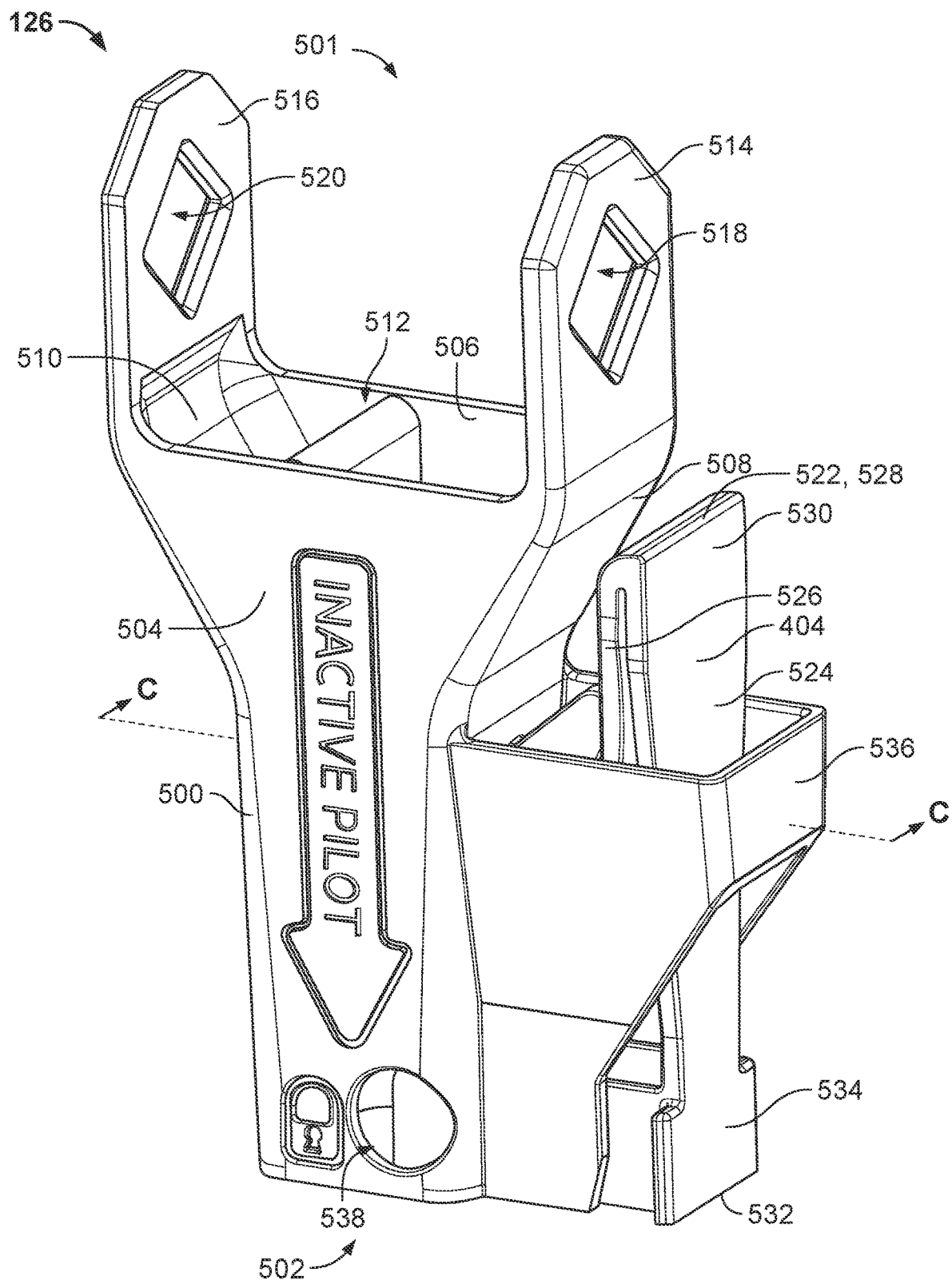
FIG. 5 is a perspective view of an example handle that can be implemented in connection with the example dual-valve assembly of FIG. 1.
Figure 6:
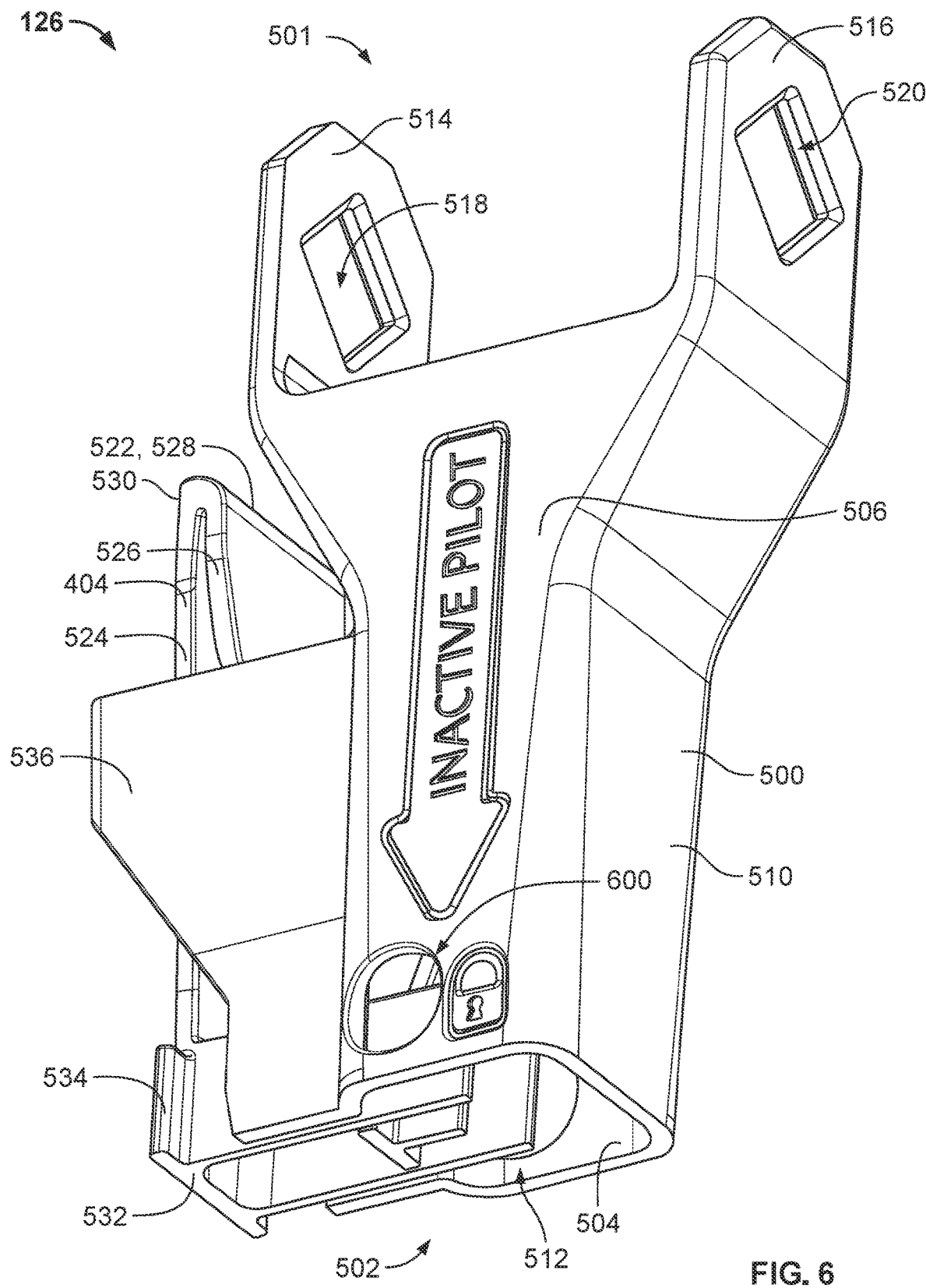
FIG. 6 is another perspective view of the example handle of FIG. 5.

FIGS. 5 and 6 are perspective views of the example handle 126. The handle 126 includes a body 500 having a first end 501 and a second end 502 opposite the first end 501. The first end 501 is to be coupled to the first and second shafts 128, 130 (FIG. 1-4) of the first and second valves 122, 124. In the illustrated example, the body 500 includes and/or is formed by a first wall 504, a second wall 506 opposite the first wall 504, a third wall 508 between the first and second walls 504, 506, and a fourth wall 510 between the first and second walls 504, 506 opposite the third wall 508. The body 500 has a rectangular, tubular shape and defines a channel 512 between the first and second ends 501, 502. An operator can grasp the body 500 of the handle 126 and rotate the handle 126. The body 500 can be any length. In some examples, the body 500 is relatively short (e.g., around 2 inches). This enables the handle 126 to fit within smaller, more compact systems. For example, if it desired to position the pilots 116, 118 (FIGS. 3 and 4) closer together, the handle 126 can be constructed shorter to fit in the space between the pilots 116, 118.

As shown in FIGS. 5 and 6, the first end 501 of the body 500 has a first tab 514 and a second tab 516. In the illustrated example, the third and fourth walls 508, 510 extend beyond the first and second walls 504, 506 and form first and second tabs 514, 516. The tabs 514, 516 correspond to connection portions for connecting to the first and second valves 122, 124 (FIGS. 1-4). In the illustrated example, the first tab 514 has a first opening 518 and the second tab 516 has a second opening 520. The openings 518, 520 are configured to receive rotatable components. For example, when the handle 126 is assembled with the first and second valves 122, 124, the first shaft 128 (FIG. 1) extends into the first opening 518, and the second shaft 130 (FIGS. 2 and 4) extends into the second opening 520, which couples the shafts 128, 130 to the respective tabs 514, 516. Therefore, the openings 518, 520 receive the shafts 128, 130, respectively, of the valves 122, 124. The openings 518, 520 are shaped or keyed to match the shape of the shafts 128, 130. In this example, the openings 518, 520 are square-shaped, which corresponds to the shape of the shafts 128, 130. As such, when the handle 126 is rotated, the handle 126 rotates the first and second shafts 128, 130. In other examples the shafts 128, 130 and/or the openings 518, 520 can be shaped differently (e.g., circular-shaped, star-shaped, triangular-shaped, etc.). In some examples, nuts can be screwed onto the ends of the shafts 128, 130 to couple the tabs 514, 516 to the shafts 128, 130. While in this example the handle 126 is disclosed in connection with rotating shafts of two valves, it is understood that the example handle 126 can be used in connection with other rotatable components.

In the illustrated example, the handle 126 includes the flexible arm 404, which functions as a detent lever. The flexible arm 404 is to used engage the notches 402a-402c (FIG. 4) of the first valve 122 (FIG. 4) to prevent the handle 126 from being rotated. The flexible arm 404 is coupled to and extends from the body 500. In the illustrated example, the flexible arm 404 has a lock end or edge 522. The lock edge 522 is sized to fit within the notches 402a-402c (FIG. 4) (e.g., which function as a detent), which limits rotation of the handle 126 relative to the first and second valves 122, 124. In some examples, the flexible arm 404 includes at least two portions connected by a bend (e.g., a corner, a fold, etc.), which enables the flexible arm 404 to flex or bend. For example, as shown in FIGS. 5 and 6, the flexible arm 404 includes a first portion 524 and a second portion 526 connected by a bend 528. The bend 528 corresponds to the lock edge 522. The first portion 524 has a first end 530 (connected to the second portion 526 at the bend 528) and a second end 532 (e.g., a free end or cantilevered end) opposite the first end 530. The area on the first portion 524 near the second end 532 is referred to herein as a lever body or pad 534. In the illustrated example, the lever pad 534 is enlarged or widen relative to the rest of the first portion 524. To move the lock edge 522 of the flexible arm 404, an operator can press inward (i.e., toward the body 500) on the lever pad 534, such as by using the operator's thumb.

In some examples, the example handle 126 can include indicia. For example, as shown in FIGS. 5 and 6, the first wall 504 and the second wall 506 include the words "INACTIVE PILOT" and an arrow pointing toward the second end 502 for the handle 126. This helps indicate to the operator which pilot is the inactive pilot. Also, as shown in FIGS. 5 and 6, the first and second walls 504, 506 include lock symbols near first and second openings 538, 600 (disclosed in further detail herein). The indicia may be formed by protrusions or recesses/etching in the surfaces of the first and second walls 504, 506. In other examples, the indicia can be printed or painted on the surfaces of the first and second walls 504, 506.

Figure 7:
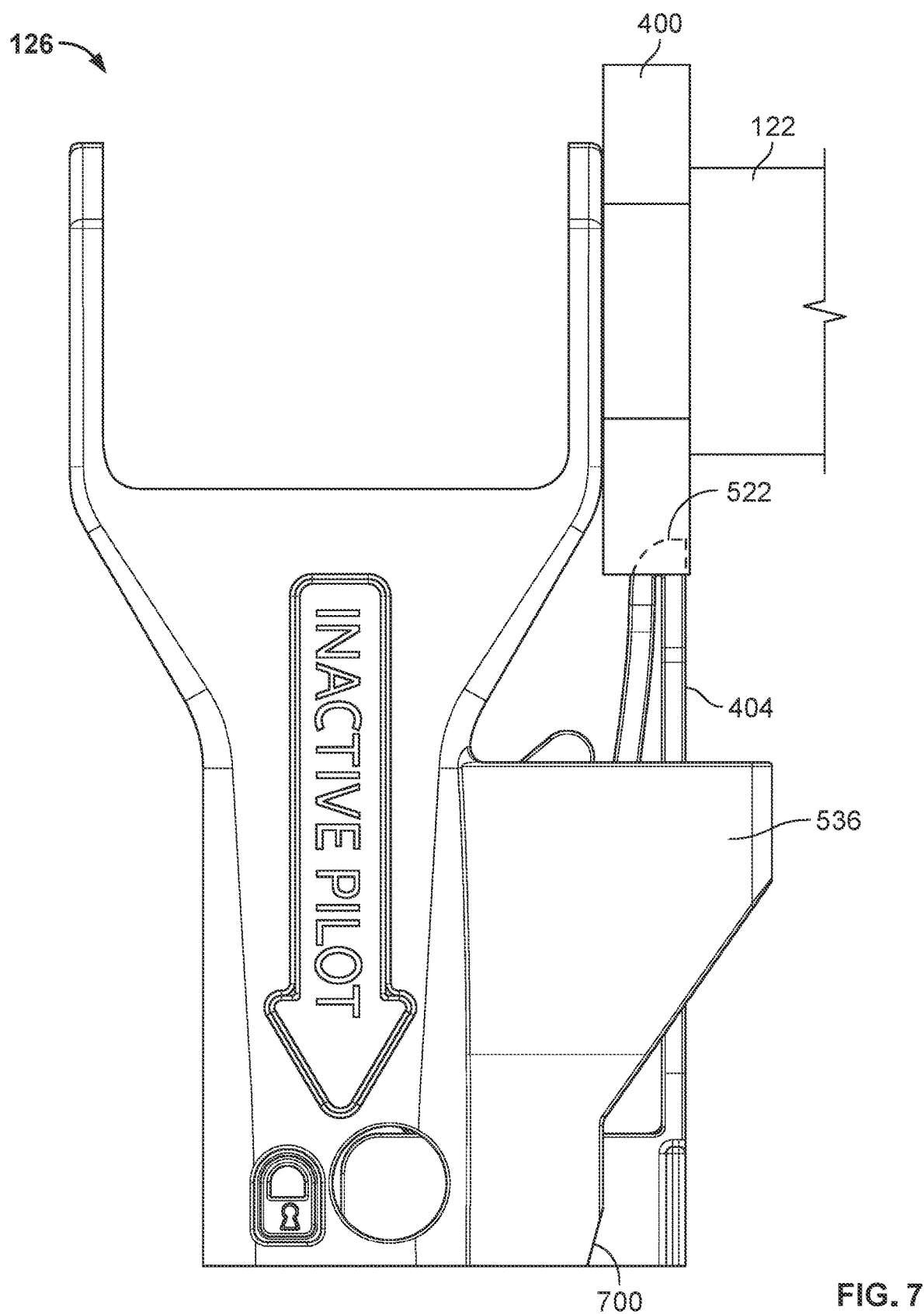
FIG. 7 is a side view of the example handle of FIG. 5.
Figure 8:
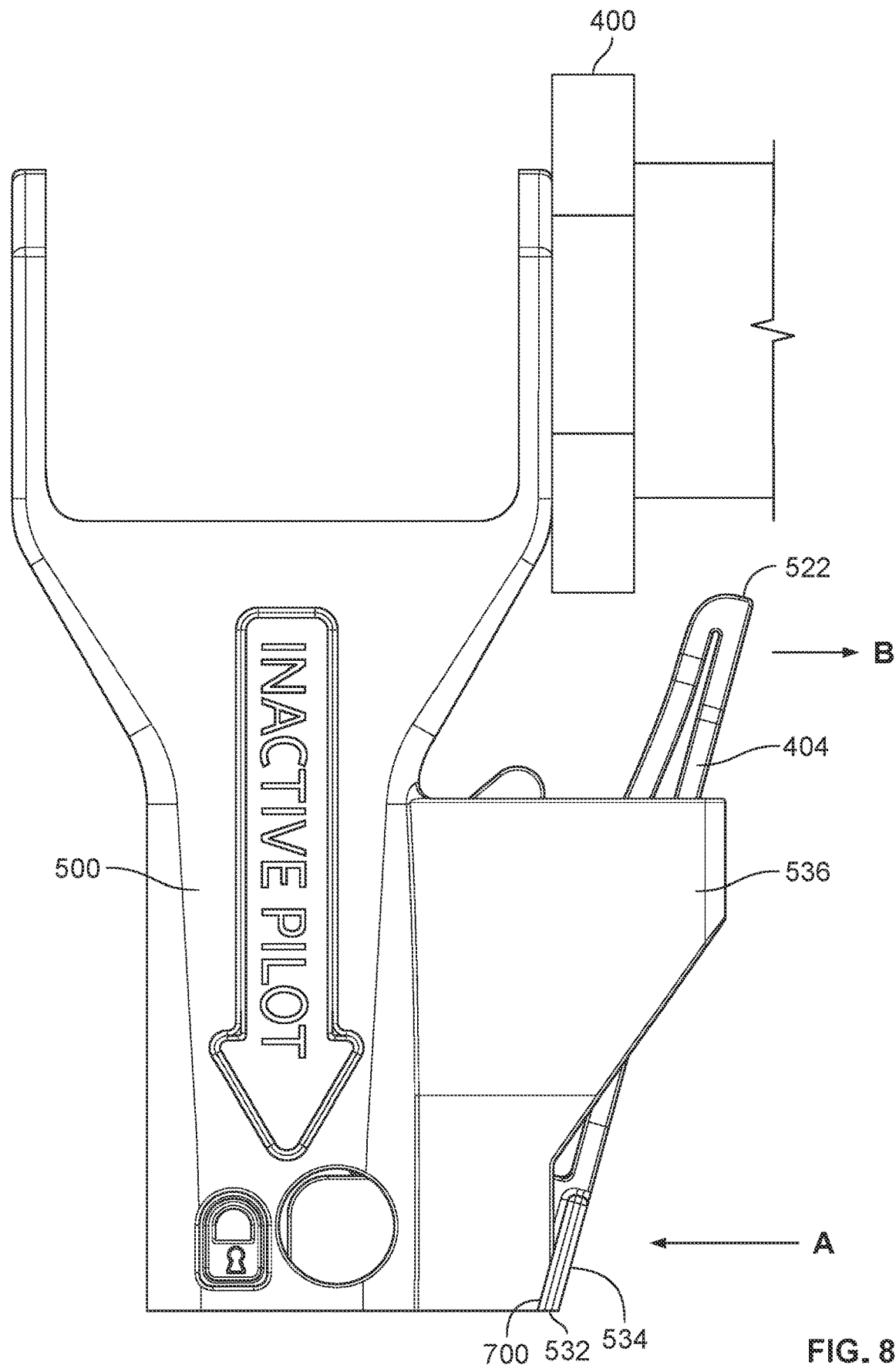
FIG. 8 shows the example handle of FIG. 7 in which the example flexible arm has been moved.

FIG. 7 is a side view of the handle 126 and a portion of the first valve 122. The flexible arm 404 is in a relaxed or neutral position. In FIG. 7, the lock edge 522 (shown in broken lines) of the flexible arm 404 is disposed in a notch (e.g., the notch 402a (FIG. 4)) of the plate 400 of the first valve 122. As such, the handle 126 cannot be rotated. As shown in FIG. 8, if the second end 532 of the flexible arm 404 is pushed toward the body 500 (as shown by arrow A), such as by pushing on the lever pad 534, the lock edge 522 is moved (e.g., pivoted) outward away from the body 500 (as shown by arrow B). As such, the lock edge 522 can be moved out of the notch of the plate 400, which permits rotation of the handle 126. The handle 126 can then be rotated to another position. When the operator releases the lever pad 534, the flexible arm 404 contracts/expands back to the position shown in FIG. 7. As such, the lock edge 522 moves back toward the body 500 (and potentially into another one of the notches).

Referring to FIGS. 5-8, the handle 126 includes a shield 536. The shield 536 is coupled to and extends outward from the third wall 508 (FIGS. 5 and 6) of the body 500. The shield 536 surrounds at least a portion of the flexible arm 404. The shield 536 limits or prevents the flexible arm 404 from being moved laterally (into and out of the page in FIGS. 7 and 8) relative to the body 500. As such, the flexible arm 404 can only move along one plane toward or away from the body 500.

As shown in FIG. 8, the shield 536 forms a stop or limit for the lever pad 534 of the flexible arm 404. In particular, when the lever pad 534 is pressed inward toward the body 500, the lever pad 534 contacts or engages the shield 536. In some examples, such as shown in FIGS. 7 and 8, the shield 536 has an angled or chamfered edge 700. The chamfered edge 700 enables the lever pad 534 to move slightly more toward the body 500, and also forms a flat surface or area for the lever pad 534 to engage.

Figure 9:
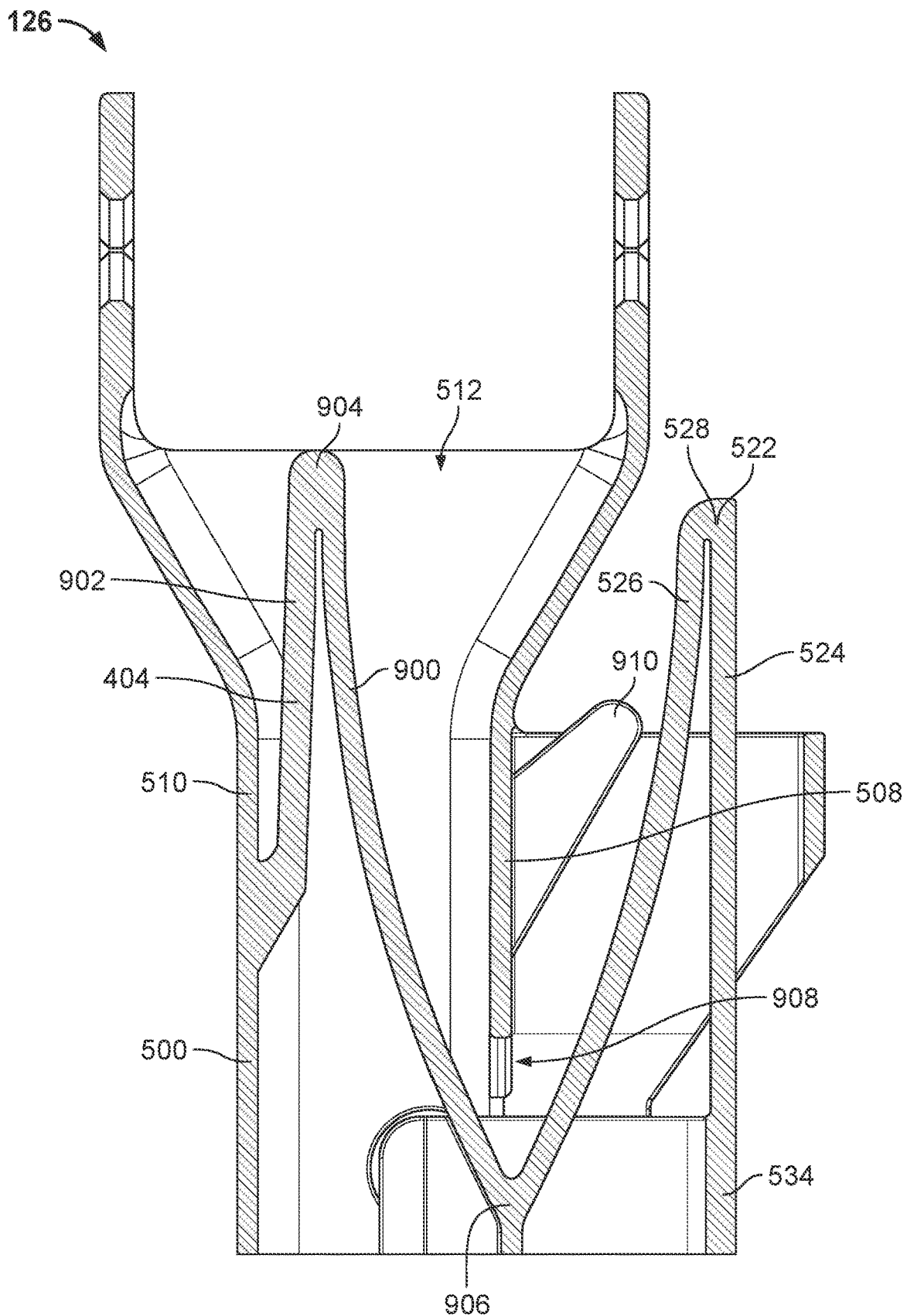
FIG. 9 is a cross-sectional view of the example handle of FIG. 5 taken along line C-C of FIG. 5.

FIG. 9 is a cross-sectional view of the example handle 126 taken along line C-C of FIG. 5. As disclosed above, the flexible arm 404 is coupled to and extends from the body 500. For example, the flexible arm 404 is cantilevered from the body 500. In this example, the flexible arm 404 is coupled to and extends from an inner surface of the fourth wall 510. However, in other examples, the flexible arm 404 can be coupled to another part of the body 500.

As shown in FIG. 9, the flexible arm 404 includes or is constructed of multiple portions or segments connected by bends. In this example, the flexible arm 404 has four portions including the first portion 524, the second portion 526, a third portion 900, and a fourth portion 902. The fourth portion 902 is coupled to the fourth wall 510 of the body 500 and extends in the upward direction in FIG. 9. The third and fourth portions 900, 902 are coupled at a first bend 904. The third portion 900 extends in the downward direction from the first bend 904 in FIG. 9. The second and third portions 526, 900 are coupled at a second bend 906. The second portion 526 extends in the upward direction from the second bend 906 in FIG. 9. The first and second portions 524, 526 are coupled at the bend 528 (a third bend), which corresponds to the lock edge 522. The first portion 524 extends in the downward direction from the bend 528 in FIG. 9. Therefore, in this example, the flexible arm 404 includes four portions connected by bends, such that the flexible arm 404 has an M-shaped profile. This arrangement of the portions 524, 526, 900, 902 and the bends 528, 904, 906 enables the flexible arm 404 to easily flex or expand/contract. In particular, this arrangement enables the flexible arm 404 to expand or contract in the left-right direction in FIG. 9. In some examples, the flexible arm 404 is a single unitary part or component. In other examples, the flexible arm 404 can have more or fewer portions and/or bends, examples of which are disclosed in further detail in connection with FIGS. 12-14. As disclosed above, the distal end section of the first portion 524 forms the lever pad 534. When an operator presses on the lever pad 534, the lever pad 534 of the first portion 524 is moved toward the body 500, which causes the bend 528 (the lock edge 522) to pivot (about the second bend 906) outward away from the body 500 (as shown in the position in FIG. 8). In some examples, the body 500 and the flexible arm 404 are constructed as a single unitary part or component (e.g., a monolithic structure). For example, the handle 126, including the body 500 and the flexible arm 404 can be printed using an additive manufacturing machine.

In the illustrated example of FIG. 9, the flexible arm 404 is coupled to the body 500 in the channel 512. In the illustrated example, the third wall 508 of the body 500 has an opening 908 (e.g., a slot). The flexible arm 404 extends through the opening 908. The third and fourth portions 900, 902 of the flexible arm 404 are disposed in the channel 512 of the body 500, and the first and second portions 524, 526 of the flexible arm 404 are disposed outside of the body 500. As such, a portion of the flexible arm 404 is in the body 500, and a portion of the flexible arm 404 is outside the body 500.

In the illustrated example of FIG. 9, the handle 126 includes a protrusion 910. The protrusion 910 acts as a travel stop. In this example, the protrusion 910 is coupled to and extends from the third wall 508 of the body 500. In other examples, the protrusion 910 can extend from the second portion 526 of the flexible arm 404. The protrusion 910 limits the amount the first and second portions 524, 526 of the flexible arm 404 can be moved toward the body 500. As a result, the protrusion 910 limits the lock edge 522 (the bend 528) from being moved (e.g., pushed) toward the body 500 and out of the notch of the valve.

In some examples, the body 500 can include an opening to receive an object, such as the lock 406 (FIG. 4). When an object is inserted into the opening, the second end 532 of the first portion 524 of the flexible arm 404 is prevented from moving toward the body 500. For example, referring back to FIGS. 5 and 6, the first wall 504 of the body 500 has a first opening 538 and the second wall 506 has a second opening 600 aligned with the first opening 538. The first and second openings 538, 600 can be referred to as lock openings. To lock the handle 126 in certain positions, an object, such as a lock, a wire, etc. can be inserted through the first and second openings 538, 600. This prevents the lever pad 534 of the flexible arm 404 from being pushed toward the body 500. As a result, the lock edge 522 cannot be moved out of the notch. This prevents someone from unlocking and rotating the handle 126. In some examples, the object can be a shank or shackle of a lock (e.g., a pad lock). For example, an operator can insert the shank or shackle of the lock 406 (FIG. 4) through the openings 538, 600 and then lock the lock 406. As such, the handle 126 may not be released until someone unlocks and removes the lock 406.

Figure 10:
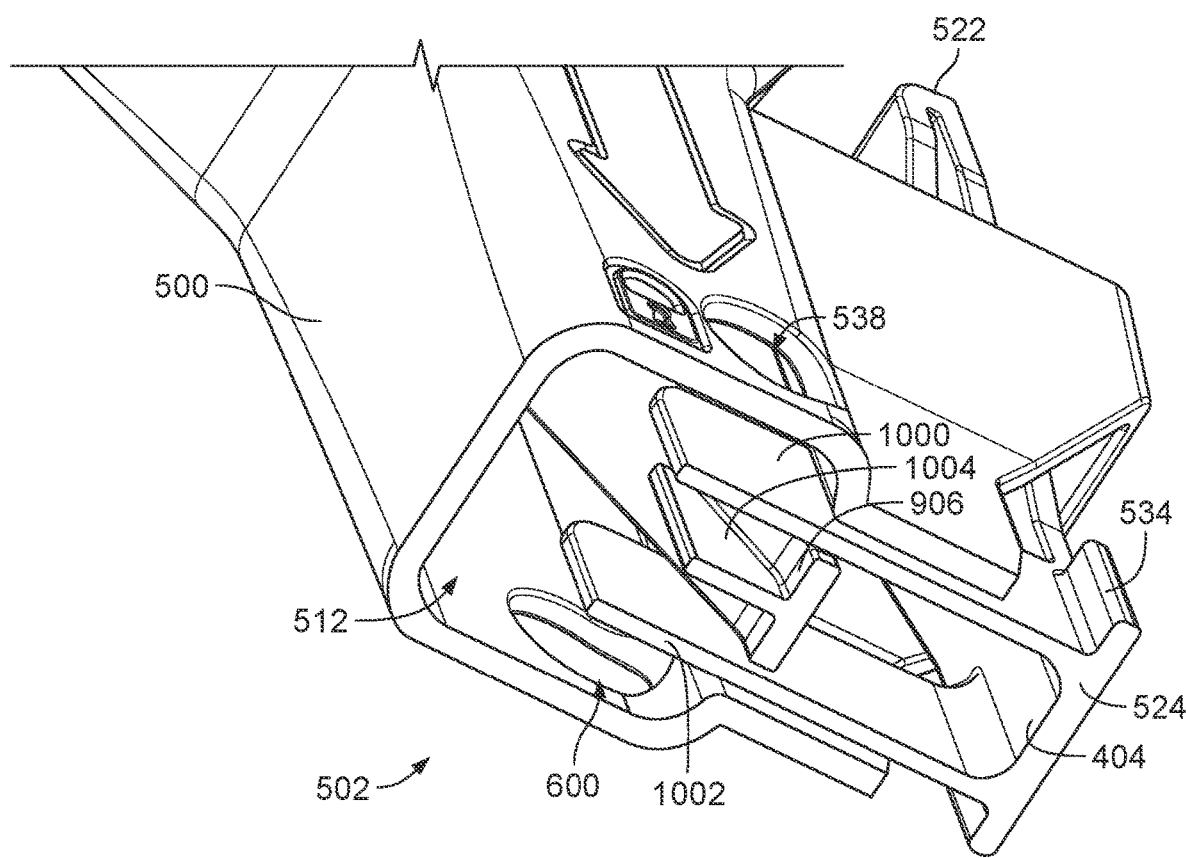
FIG. 10 is perspective view of an end of the example handle of FIG. 5.

FIG. 10 is a perspective view of the second end 502 of the body 500. As shown in FIG. 10, the flexible arm 404 has first and second tabs 1000, 1002 that extend from the first portion 524 of the flexible arm 404 (at or near the lever pad 534) toward the body 500. The tabs 1000, 1002 extend into the channel 512 of the body 500. The first and second tabs 1000, 1002 are spaced apart from each other. The second bend 906 of the flexible arm 404 is disposed between (but not directly coupled to) the first and second tabs 1000, 1002. In the illustrated example, a third tab 1004 extends from the second bend 906. When an object, such as a lock, is inserted through the openings 538, 600, the first, second, and third tabs 1000-1004 engage the lock. As such, the first and second tabs 1000, 1002 prevent the lever pad 534 from being moved toward the body 500, thereby preventing the lock edge 522 (FIG. 5) from moving away from the body 500. Further, the third tab 1004 prevents the lock edge 522 from being flexed away from the body 500 (e.g., if a user pulled directly on the lock edge 522). While in this example the flexible arm 404 includes two tabs, in other examples, the flexible arm 404 can include more or fewer tabs (e.g., one, three, four, etc.).

In some examples, when the flexible arm 404 is in the relaxed or neutral state as shown in FIG. 10, the first and second tabs 1000, 1002 are disposed between the openings 538, 600, such that only a small area of the openings 538, 600 are accessible. In some examples, this enables a wire or thinner object to be inserted into the openings 538, 600. In other examples, the first and second tabs 1000, 1002 may extend completely across the openings 538, 600. Therefore, in some examples, to insert a larger object, such as a shackle of the lock 406 (FIG. 4), the operator must first move the lever pad 534 away slightly away from the body 500 until the tabs 1000, 1002 clear the openings 538, 600. Then, an object can be inserted through the openings 538, 600 and the lever pad 534 can be released. However, in other examples, the first, second, and/or third tabs 1000-1004 can be longer or shorter.

Figure 11:
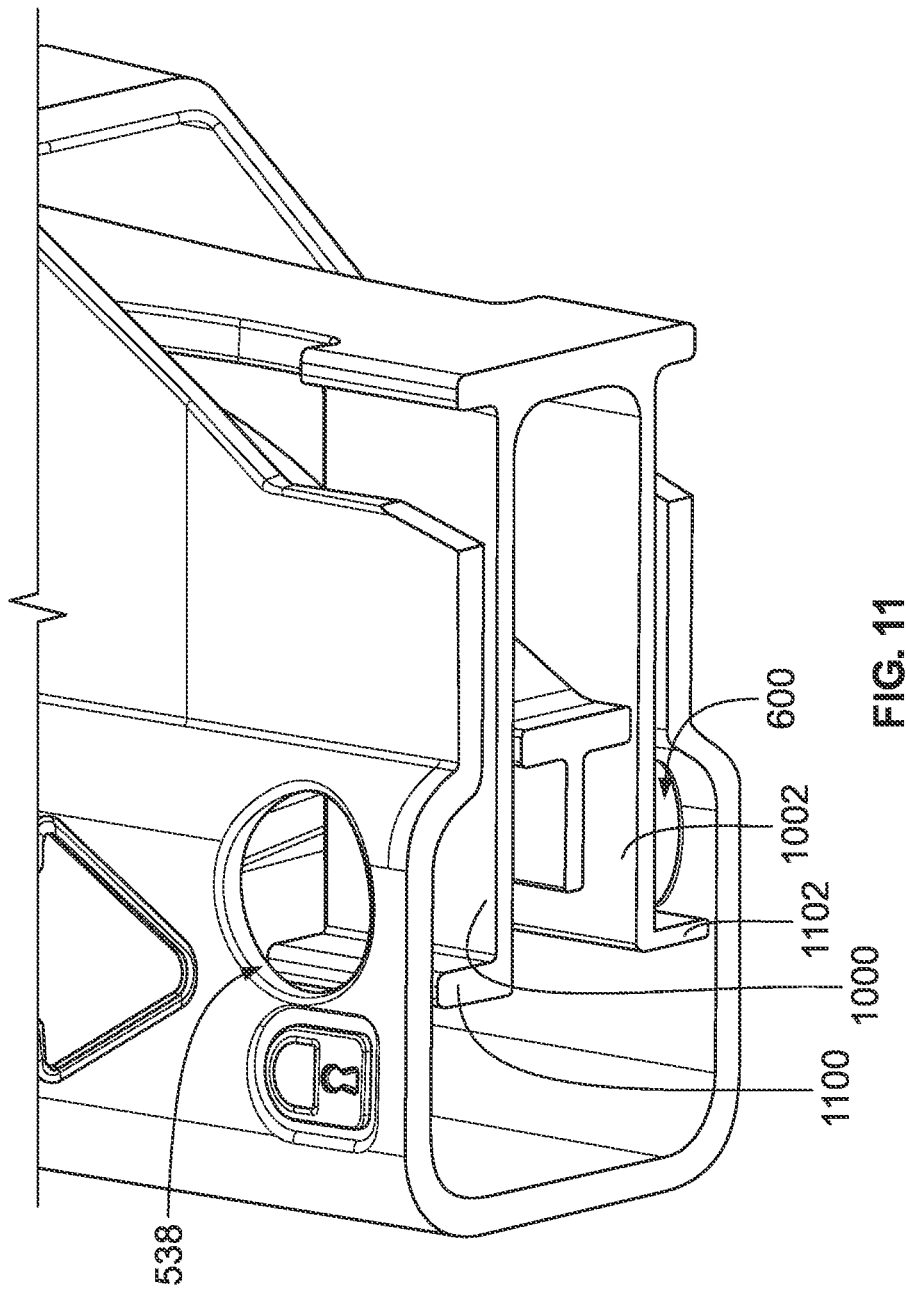
FIG. 11 shows example extensions that can be implemented on the example handle of FIG. 5.

FIG. 11 shows an example in which the first and second tabs 1000, 1002 include extensions 1100, 1102, respectively, that extend perpendicular to the tabs 1000, 1002. As such, in this example, the first and second tabs 1000, 1002 have L-shaped profiles. The extensions 1100, 1102 increase the surface area or contact area between the first and second tabs 1000, 1002 and the object, which limits or reduces the tabs 1000, 1002 from crimping or bending the object. For example, if a wire is inserted through the openings 538, 600, the increased surface area helps limit or prevent the first and second tabs 1000, 1002 from crimping or bending the wire.

In some examples, the handle 126 is constructed as a single unitary part or component (e.g., a monolithic structure). In some examples, the handle 126 is 3D printed (i.e., constructed via an additive manufacturing process). In such examples, the handle 126 is composed of multiple layers of a same material bonded together. In some examples, the handle 126 is printed vertically from the second end 502 to the first end 501. Example 3D printing operations are disclosed in further detail herein. In other examples, the handle 126 can be constructed via other manufacturing processes, such as casting, machining, etc. In other examples, the handle 126 can be constructed of multiple parts or components that are coupled together. For example, the flexible arm 404 can be constructed as a separate component that is coupled (e.g., via welding, via fasteners) to the body 500. In some examples, the handle 126 is constructed of metal, such as 316 stainless steel. In other examples, the handle 126 can be constructed of other materials.

Figure 12:
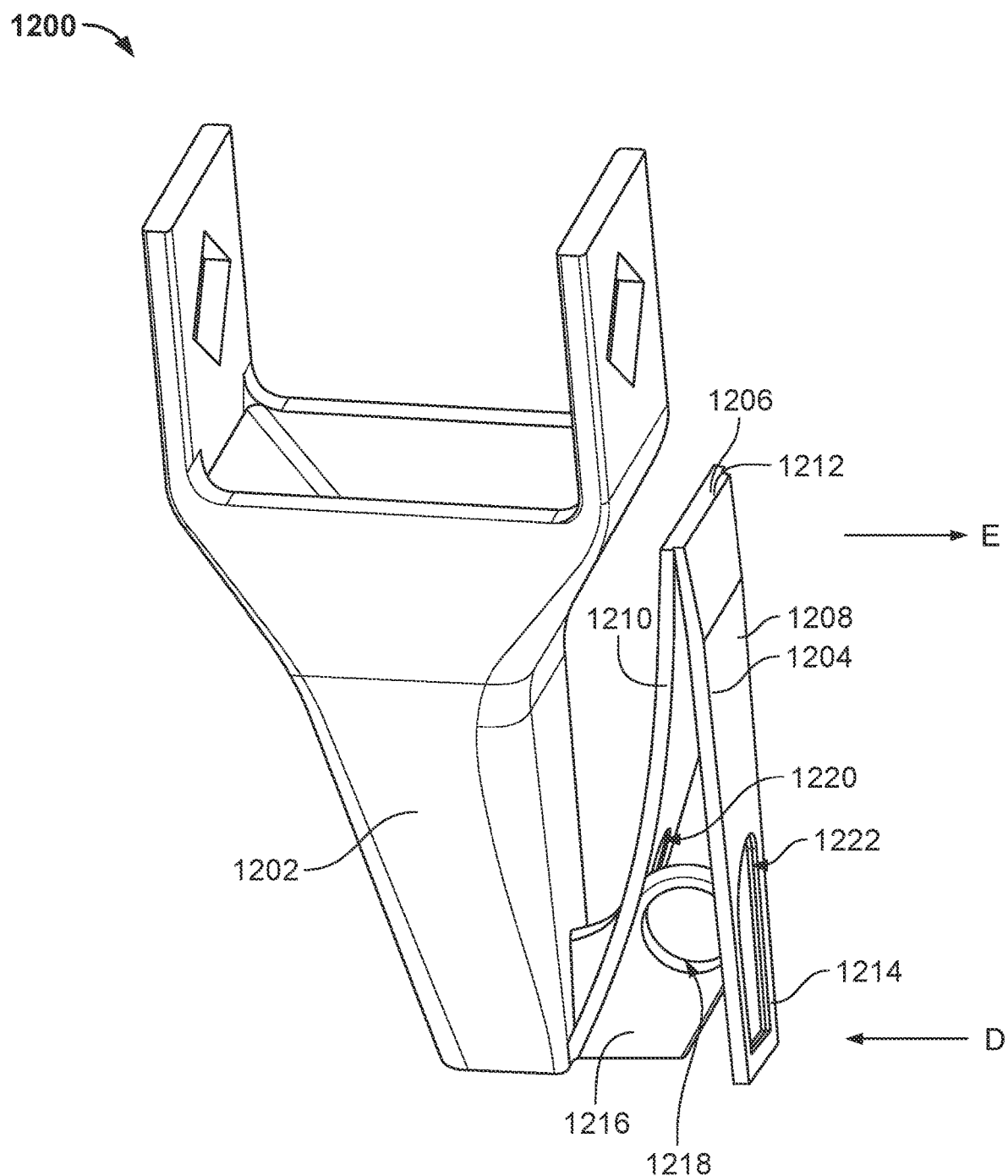
FIG. 12 is a perspective view of another example handle that can be implemented in connection with the example dual-valve assembly of FIG. 1.

FIG. 12 illustrates another example handle 1200. The example handle 1200 can be used in a similar manner as the handle 126 in connection with the dual-valve assembly 120 of FIGS. 1-4. In the illustrated example, the handle 1200 includes a body 1202. The body 1202 is substantially the same as the body 500 of the handle 126 disclosed above. Therefore, any of the example aspects disclosed in connection with the body 500 can likewise apply to the body 1202.

In the illustrated example of FIG. 12, the handle 1200 includes a flexible arm 1204. The flexible arm 1204 has a lock edge 1206. The lock edge 1206 is sized and shaped to fit within the notches 402a-402c of the first valve 122 to lock the handle 1200 in certain positions. In the illustrated example, the flexible arm 1204 is coupled to and extends from the body 1202. In this example, the flexible arm 1204 has a first portion 1208 and a second portion 1210. The first portion 1208 is coupled to and extends from the body 1202 in the upward direction in FIG. 12. The first and second portions 1208, 1210 are coupled at a bend 1212, which corresponds to the lock edge 1206. In this example, the flexible arm 1204 has a V-shaped profile. This arrangement of the portions 1208, 1210 and the bend 1212 enables the flexible arm 1204 to flex (e.g., expand or contract). The distal end of the first portion 1208 forms a lever body or pad 1214. An operator can press on the lever pad 1214 to move the lock edge 1206. For example, when an operator presses on the lever pad 1214, the lever pad 1214 moves toward the body 1202 (in the direction of arrow D), which causes the lock edge 1206 to move (e.g., pivot) away from the body 1202 (in the direction of arrow E).

In the illustrated example of FIG. 12, the handle 1200 includes a tab 1216 that is coupled to and extending from the body 1202. The tab 1216 has an opening 1218. The opening is between the second portion 1210 of the flexible arm 1204 and the body 1202. An object, such as a lock, can be inserted through the opening 1218. When an object is inserted into the opening 1218, the object blocks the lever pad 1214 of the flexible arm 1204 from moving toward the body 1202, which prevents the lock edge 1206 from being moved outward. In the illustrated example, the tab 1216 extends through a first slot 1220 in the first portion 1208 of the flexible arm 1204. The second portion 1210 has a second slot 1222 aligned with the tab 1218, which enables the second portion 1210 to be moved toward the body 1202 without engaging the tab 1216.

Figure 13:
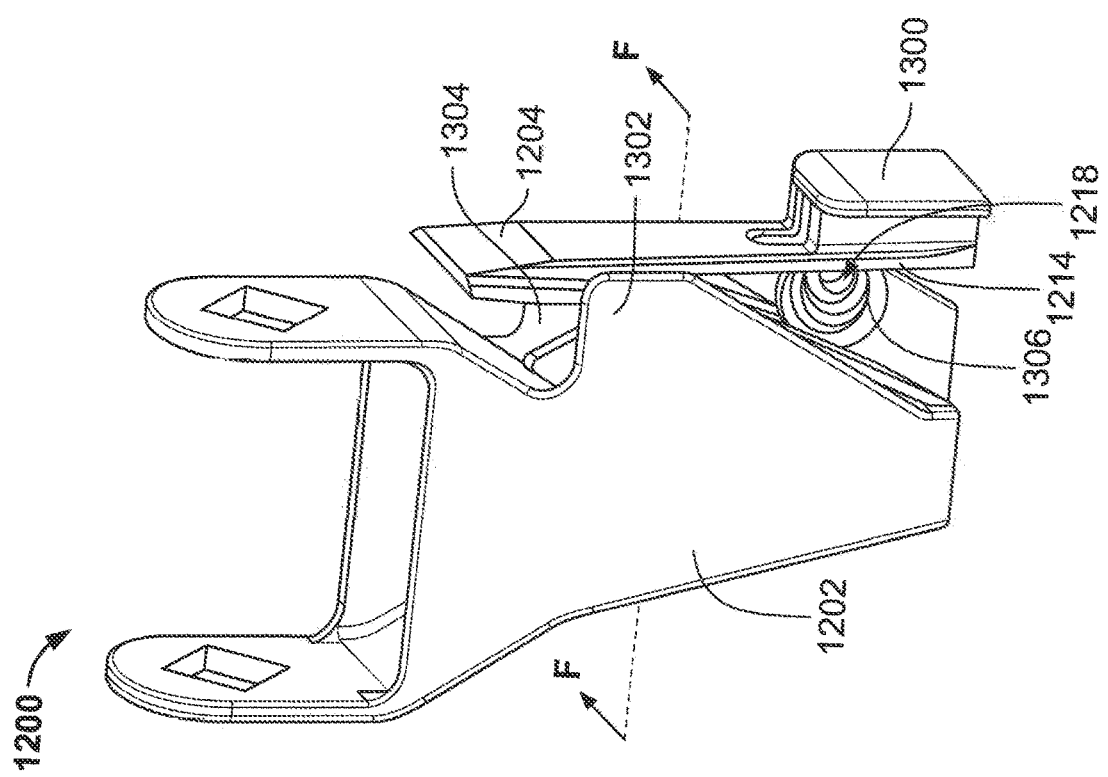
FIG. 13 shows the example handle of FIG. 12 with additional components.

In some examples, the handle 1200 include one or more additional features or components. FIG. 13 shows an example of the handle 1200 including additional features or components that can be implemented. For example, as shown in FIG. 13, the handle 1200 includes an extension 1300 on the lever pad 1214. The extension 1300 forms a larger area for the operator to press, which reduces operator fatigue.

In the illustrated example of FIG. 13, the handle 1200 includes first and second shield walls 1302, 1304. The shield walls 1302, 1304 extend from the body 1202 and cover or surround at least a portion of the flexible arm 1204. The shield walls 1302, 1304 prevent or limit the flexible arm 1204 from being moved laterally relative to the body 1202. This constrains the flexible arm 1204, such that flexible arm 1204 can only move along one plane toward or away from the body 1202.

In the illustrated example of FIG. 13, the opening 1218 includes a punch-out 1306. The punch-out 1306 reduces the size for the opening 1218 to accommodate smaller objects, such as a wire. This also ensure smaller objects are positioned closer to the flexible arm 1204 to limit movement of the flexible arm 1204. In some examples, the punch-out 1306 is perforated and can be removed, also referred to as being punched-out. Therefore, if it is desired to insert a larger object into the opening 1218, the punch-out 1306 can be removed. In some examples, the punch-out 1306 can include multiple punch-outs that can be removed to progressively enlarge the size of the opening 1218.

Figure 14:
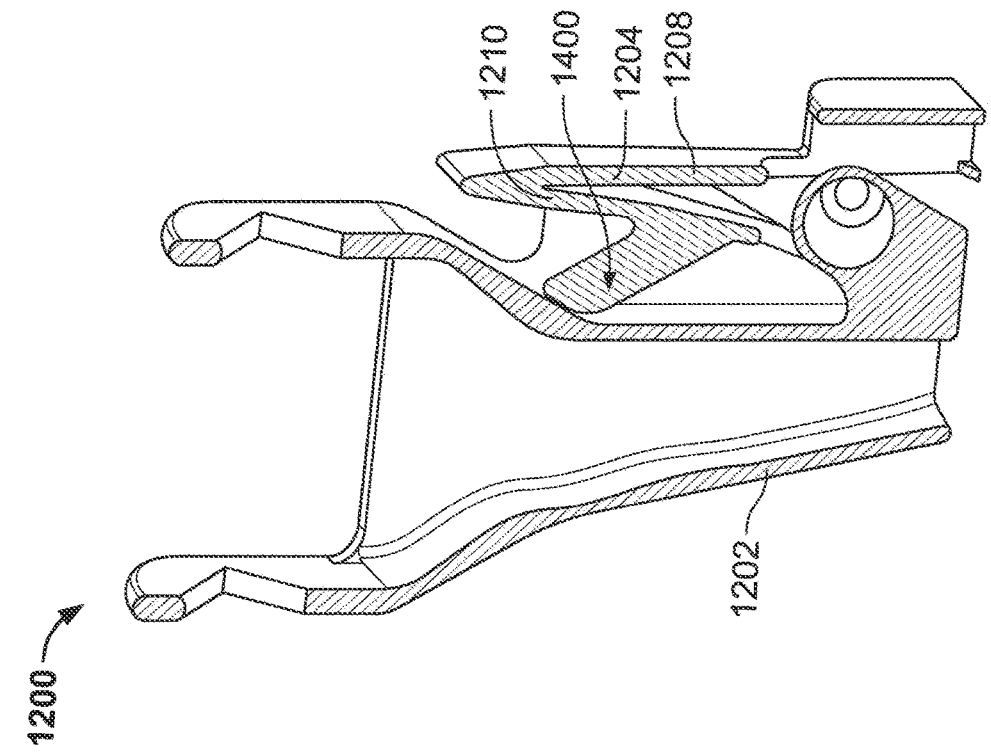
FIG. 14 is a cross-sectional view of the example handle of FIG. 13 taken along line F-F.

FIG. 14 is a cross-sectional view of the example handle of FIG. 13 taken along line F-F. As shown in FIG. 14, the handle 1200 includes a protrusion 1400. The protrusion 1400 acts as a travel stop. In this example, the protrusion 1400 is coupled to and extends from the first portion 1208 of the flexible arm 1204. The protrusion 1400 extends inward toward the body 1202. The protrusion 1400 limits the amount the first and second portions 1208, 1210 of the flexible arm 1204 can be moved toward the body 1202. As a result, the protrusion 1400 limits the lock edge 1206 from being moved (e.g., pushed) too far toward the body 1202 and out of the notch of the valve. In some examples, the handle 1200 is constructed as a single unitary part or component (e.g., a monolithic structure). For example, the handle 1200, including the body 1202 and the flexible arm 1204 can be printed using an additive manufacturing machine.

Figure 15:
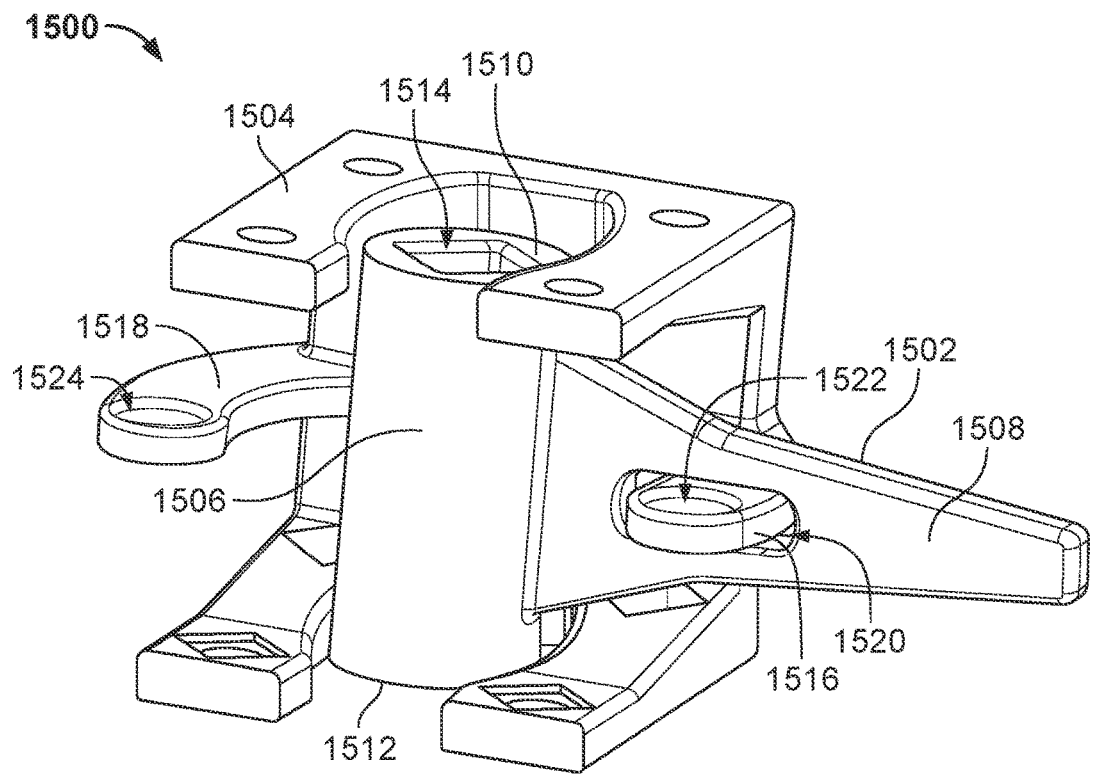
FIG. 15 is a perspective view of an example handle assembly including an example handle that can be implemented in connection with the example dual-valve assembly of FIG. 1.

FIG. 15 illustrates an example handle assembly 1500 that can be implemented in connection with the dual-valve assembly of FIGS. 1-4. The handle assembly 1500 includes an example handle 1502 and an example bracket 1504. The handle 1502 can be coupled to the valves 122, 124 and used to operate both valves 122, 124 simultaneously.

In the illustrated example, the handle 1502 includes a socket 1506 and a lever arm 1508 coupled to and extending from the socket 1506. In some examples, the socket 1506 and the lever arm 1508 are constructed as a single unitary part or component (e.g., a monolithic structure). The socket 1506 has a first end 1510, a second end 1512 opposite the first end 1510, and an opening 1514 extending through the socket 1506 between the first and second ends 1510, 1512.

Figure 16:
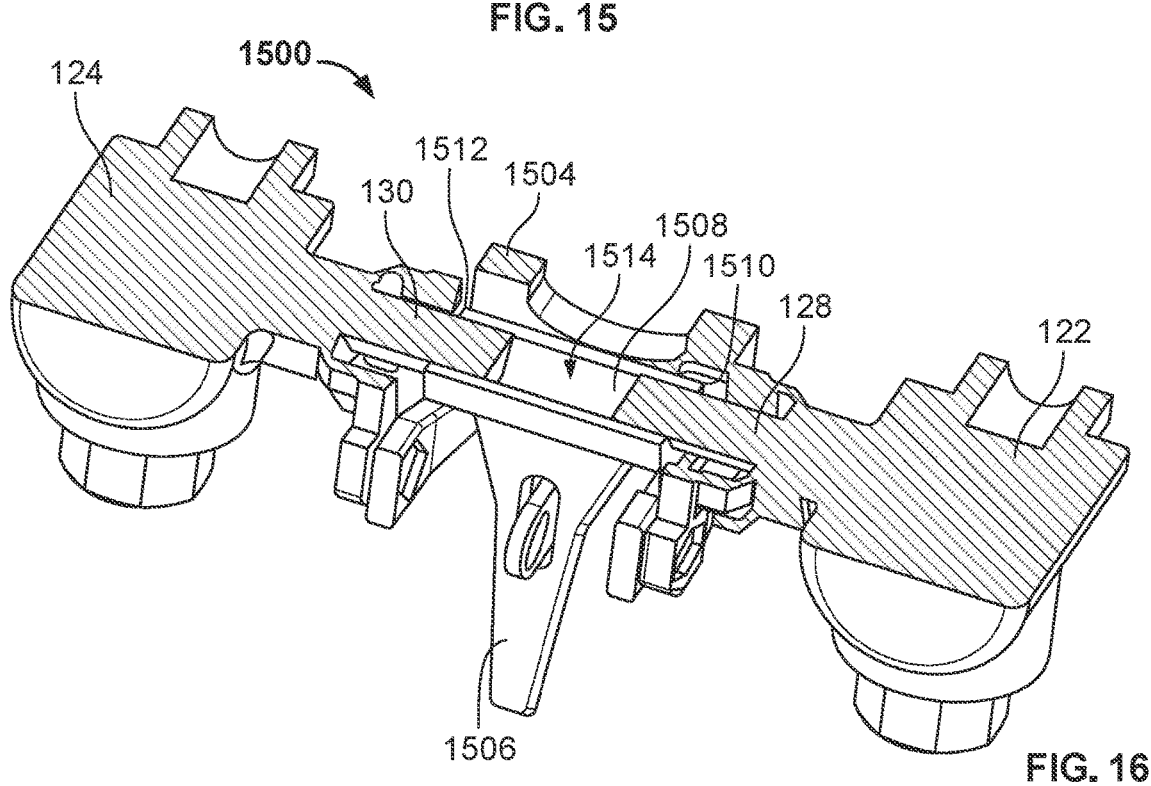
FIG. 16 is a cross-sectional view of the example handle assembly of FIG. 15 and the example valves of the example dual-valve assembly of FIG. 1.

FIG. 16 is a cross-sectional view showing the example handle assembly 1500 coupled between the first and second valves 122, 124. In some examples, the bracket 1504 is coupled to the first and second valves 122, 124, such as with threaded fasteners (e.g., bolts). As shown in FIG. 16, the first shaft 128 of the first valve 122 extends into the opening 1514 in the first end 1510 of the socket 1506 and the second shaft 130 of the second valve 124 extends into the opening 1514 in the second end 1512 of the socket 1506. The opening 1514 is shaped to match the shape or profile of the first and second shafts 128, 130. An operator can grasp the lever arm 1508 and rotate the socket 1506, which rotates both of the shafts 128, 130 simultaneously.

As shown in FIG. 15, the bracket 1504 includes a first arm 1516 and a second arm 1518. The lever arm 1508 includes an opening 1520. When the lever arm 1508 is in the position shown in FIG. 15, the first arm 1516 extends through the opening 1520 of the lever arm 1508. This may correspond to a position in which one of the pilots 116, 118 is active and one of the pilots 116, 118 is inactive. The first arm 1516 has a first opening 1522 (e.g., a lock opening). An object, such the lock 406 (FIG. 4), can be inserted into the first opening 1522 in the first arm 1516, which locks the handle 1502 in position. When the object is removed, the handle 1502 can be rotated 180° to a position where the second arm 1518 extends through the opening 1520 in the lever arm 1508. This may correspond to a position where the active/inactive pilots are switched. The second arm 1518 has a second opening 1524 (e.g., a lock opening). The object can be inserted into the second opening 1524 to lock the handle 1502 in position. In some examples, the handle 1502 and the bracket 1504 can be printed using an additive manufacturing machine.

Figure 17:
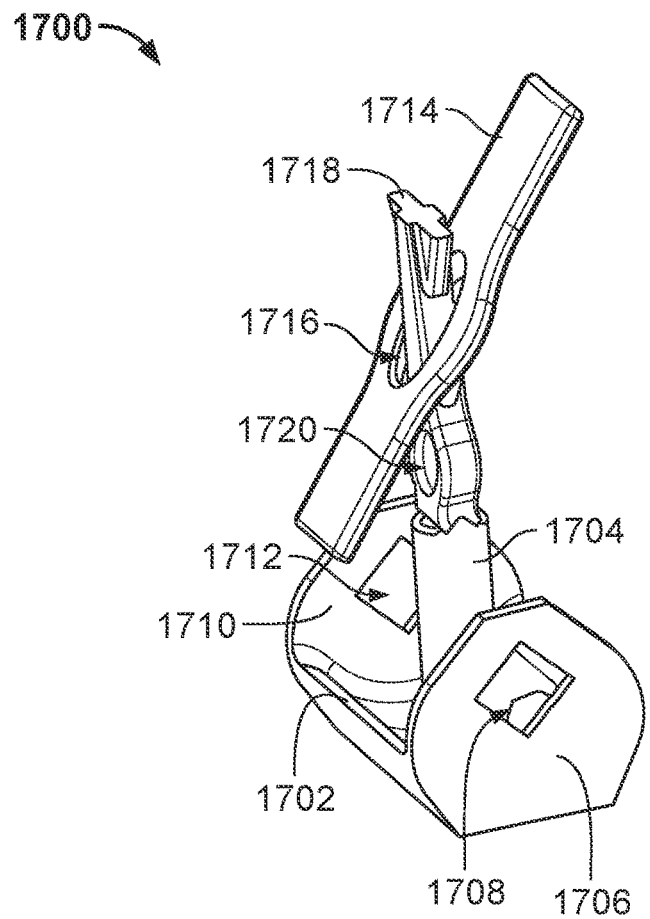
FIG. 17 is a perspective view of another example handle that can be implemented in connection with the example dual-valve assembly of FIG. 1.

FIG. 17 illustrates another example handle 1700. The example handle 1700 can be implemented in connection with the dual-valve assembly of FIGS. 1-4. The handle 1700 can be coupled to the shafts 128, 130 of the valves 122, 124 to operate the valves 122, 124 simultaneously.

In the illustrated example, the handle 1700 includes a socket 1702 and a lever arm 1704 coupled to and extending from the socket 1702. In some examples, the socket 1702 and the lever arm 1704 are constructed as a single unitary part or component (e.g., a monolithic structure). The socket 1702 has a first end wall 1706 with a first opening 1708 and a second end wall 1710, opposite the first end wall 1706, with a second opening 1712. When the handle 1700 is coupled to the valves 122, 124, the first shaft 128 extends into the first opening 1708 and the second shaft 130 extends into the second opening 1712. The openings 1708, 1712 are shaped to match the shape or profile of the first and second shafts 128, 130. As such, when the handle 1700 is rotated, the handle 1700 rotates the shafts 128, 130 simultaneously.

In the illustrated example, the handle 1700 includes a plate 1714 that can be used to lock the handle 1700 in certain positions. The plate 1714 has an opening 1716. The lever 1704 extends through the opening 1716. The plate 1714 is free-floating on the lever 1704. Therefore, the plate 1714 is moveable (e.g., slidable) along the lever arm 1704. An end 1718 of the lever arm 1704 is enlarged to prevent the plate 1714 from sliding completely off the lever arm 1704. The ends of the plate 1714 are sized and shaped to fit in notches of the valves 122, 124. For example, FIG. 18 shows the handle 1700 coupled to the first and second valves 122, 124.

Figure 18:
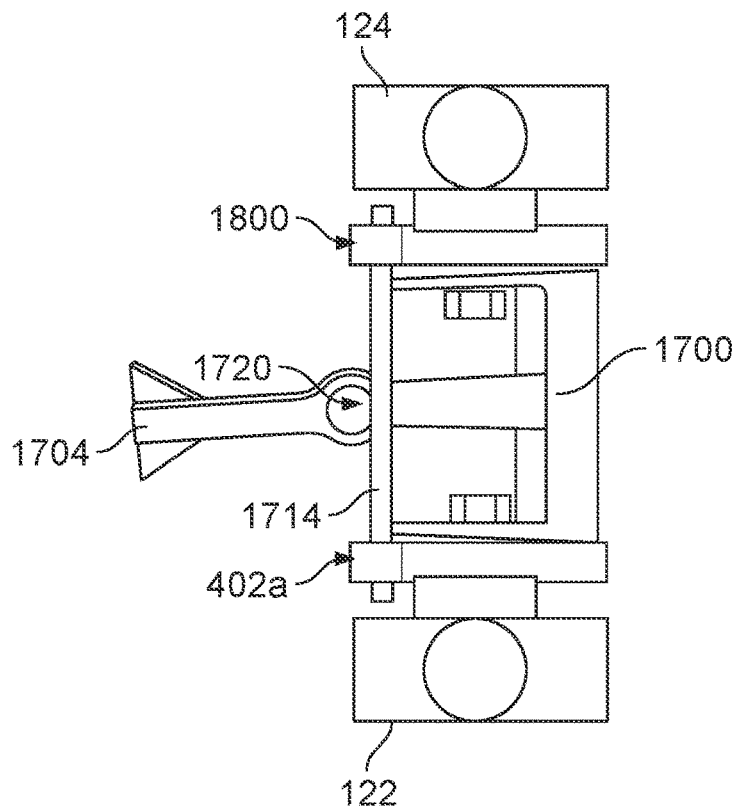
FIG. 18 shows the example handle of FIG. 17 in connection with the example valves of the example dual-valve assembly of FIG. 1.

As shown in FIG. 18, the ends of the plate 1714 are disposed in notches 402a, 1800 of the respective valves 122, 124. As such, the handle 1700 is prevented from rotating. As shown in FIGS. 17 and 18, the lever arm 1704 has an opening 1720. An object, such as the lock 406 (FIG. 4), can be inserted through the opening 1720. When the lock is inserted through the opening 1720, the plate 1714 is prevented from moving out of the notches 402a, 1800. This locks the handle 1700 in place. To move the handle 1700 to another position, the lock is removed, the plate 1714 is pulled out of the notches 402a, 1800, and the handle 1700 can be rotated to another position.

In some examples, the socket 1702 and the lever arm 1704 are printed as a single component, and the plate 1714 is printed as a separate component on the lever arm 1704. As such, no additional manufacturing steps are necessary to assemble the plate 1714 on the lever arm 1704.

While the example handles 126, 1200, 1502, 1700 are disclosed in connection with operating two valves, any of the example handles 126, 1200, 1502, 1700 can be similarly used in connection with only one valve. For example, the handle 126 can be connected to just one valve instead of two valves. The handle 126 can be locked in one or more rotational positions as disclosed herein.

Figure 19:
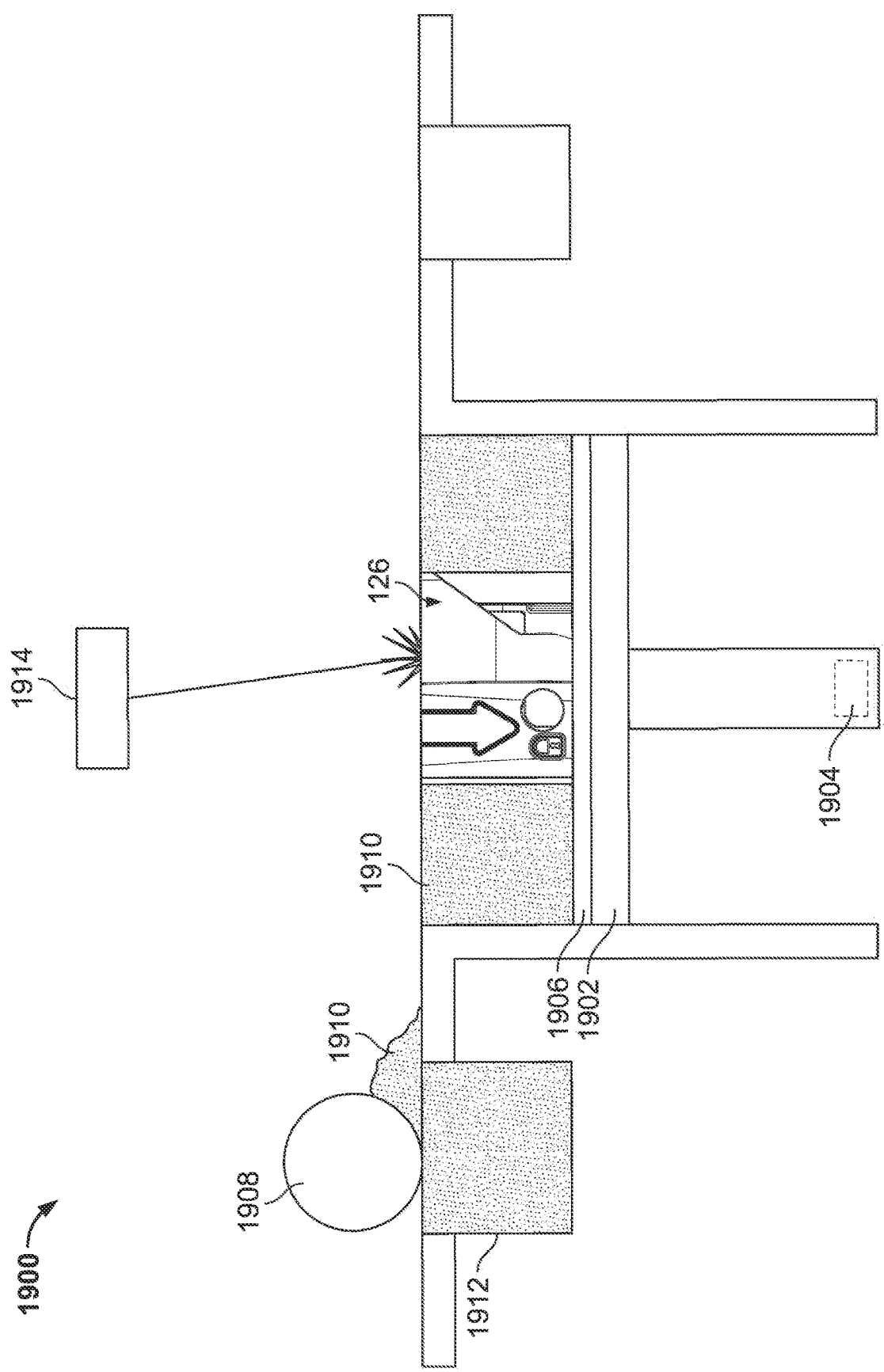
FIG. 19 illustrates an example additive manufacturing machine that can be used to form any of the example handles and/or handle assemblies disclosed herein.

As disclosed herein, any of the example handles 126, 1200, 1502, 1700 and/or the example handle assembly 1500 can be printed or formed via an additive manufacturing machine, commonly referred to as a 3D printer. FIG. 19 illustrates an example powder bed fusion machine 1900, which is a type of AM machine or 3D printer, that may be used to print or form any of the example handles 126, 1200, 1502, 1700 and/or the example handle assembly 1500. In this example, the powder bed fusion machine 1900 is shown as printing one of the example handles 126. However, it is understood that the powder bed fusion machine 1900 can be similarly used to print any of the other example handles 1200, 1502, 1700 and/or the example handle assembly 1500.

In the illustrated example, the powder bed fusion machine 1900 includes a build platform 1902 that is moveable up and down via a platform motor 1904. To create one or more objects, such as the handle 126, a substrate 1906 is placed on the build platform 1902. The substrate 1906 may be, for example, a sheet of metal such as stainless steel. Then, a roller 1908 spreads a thin layer (e.g., 40 microns) of powder material 1910 from a reservoir 1912 (e.g., a hopper) over a top of the substrate 1906 and the build platform 1902. The powder material 1910 can be any metal (e.g., stainless steel) and/or polymer based material. Then, a laser 1914 applies energy to the layer of powder material 1910 (in the shape of a cross-section of the 3D handle), which sinters, fuses, and/or otherwise hardens the powder material 1910 to form a layer of the handle 126. In this example, the first layer of the handle 126 is welded or sintered to the substrate 1906. Next, the build platform 1902 is moved downward a small amount, (e.g., 0.1 millimeter (mm)) via the platform motor 1904, and the roller 1908 spreads another layer of the powder material 1910 over the build platform 1902 and over the first hardened layer(s). The laser 1914 then applies energy to the powder material 1910 to harden the material onto the previous layer(s). This process is repeated to build the handle 126 layer-by-layer. Therefore, the handle 126 can be composed of multiple layers of a same material (e.g., stainless steel) bonded together. In this example, the handle 126 is built vertically starting from the second end 502 (FIG. 5). In other examples, the handle 126 can be built in another direction.

Other types of powder bed fusion AM processes may be completed by a variety of techniques such as, for example, direct metal laser sintering, electron beam melting, selective heat sintering, selective laser melting, selective laser sintering, etc. Powder bed fusion methods use either a laser or electron beam to melt and fuse material powder together. While some of the example handles and/or handle assemblies disclosed herein are described as being built by a powder bed fusion AM machine, the example handles and/or handle assemblies disclosed herein can likewise be implemented with any other type of AM process or machine, such as VAT photopolymerisation, material jetting, binder jetting, material extrusion, sheet lamination, and/or directed energy deposition.

FIG. 20 is a flowchart representative of an example method 2000 of manufacturing a handle for a dual-valve assembly. The example method 2000 is described in connection with the handle 126. However, it is understood that the example method 2000 may be similarly performed in connection with any of the other example handles 1200, 1502, 1700 and/or the example handle assembly 1500.

At block 2002, the example method 2000 includes printing, via a 3D printer, a handle on a substrate. For example, the handle 126 can be printed via the powder bed fusion machine 1900 of FIG. 19. In some examples, the handle 126 is printed vertically from the second end 502 to the first end 501. In some examples, the handle 126 is printed from stainless steel. Therefore, in some examples, the handle 126 includes stainless steel. In some examples, multiple handles can be printed on the substrate 1906 simultaneously in a horizontal arrangement.

At block 2004, the example method 2000 includes removing the handle from the substrate. For example, the handle 126 can be removed from the substrate 1906 via a cutting tool or machine. In some examples, the handle 126 is cut from the substrate 1906 along a cutting plane between the second end 502 and the substrate 1906. In some examples, one or more post-processing operations may be performed, such as machining (e.g., drilling, stamping, etc.), painting, sand-blasting, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example valves, valve assemblies, and dual-valve assemblies having example handles disclosed herein are easier and less expensive to manufacture than known handles. The example handles and handle assemblies can be constructed smaller than known handles, which enables the handles or handle assemblies to be used in smaller, more compact systems.

Example methods, apparatus, and articles of manufacture have been disclosed herein. Examples and example combinations disclosed herein include:

Example 1 is a dual-valve assembly including a first valve having a first shaft. The first valve has a plate with a notch. The dual-valve assembly includes a second valve having a second shaft and a handle coupled to the first and second shafts, such that when the handle is rotated, the first and second shafts are rotated simultaneously. The handle includes a body and a flexible arm coupled to and extending from the body. The flexible arm has a lock edge sized to fit within the notch to limit rotation of the handle relative to the first and second valves.

Example 2 includes the dual-valve assembly of Example 1, wherein the flexible arm includes a first portion and a second portion connected by a bend. The bend corresponds to the lock edge.

Example 3 includes the dual-valve assembly of Example 2, wherein the first portion of the flexible arm has a first end and a second end opposite the first end. The first end is coupled to the second portion at the bend, and wherein, when the second end is moved toward the body, the lock edge moves away from the body.

Example 4 includes the dual-valve assembly of Example 3, wherein the body includes an opening to receive a lock, and wherein, when a lock is inserted into the opening, the second end of the first portion of the flexible arm is prevented from moving toward the body.

Example 5 includes the dual-valve assembly of Example 4, wherein the flexible arm includes a tab extending from the first portion of the flexible arm toward the body. The tab is to engage the lock.

Example 6 includes the dual-valve assembly of any of Examples 1-5, wherein the flexible arm includes four portions connected by bends, such that the flexible arm has an M-shaped profile.

Example 7 includes the dual-valve assembly of any of Examples 1-6, wherein the body defines a channel. The flexible arm is coupled to the body in the channel, and wherein at least a portion of the flexible arm is in the channel, and at least a portion of the flexible arm is outside of the body.

Example 8 includes the dual-valve assembly of any of Examples 1-7, wherein the handle includes a shield coupled to the body. The shield surrounds at least a portion of the flexible arm to limit the flexible arm from being moved laterally relative to the body.

Example 9 includes the dual-valve assembly of any of Examples 1-8, wherein the handle includes a protrusion extending from the body to limit the lock edge from being moved toward the body.

Example 10 includes the dual-valve assembly of any of Examples 1-9, wherein the body includes a first end and a second end opposite the first end. The first end is coupled to the first and second shafts. The body includes an arrow pointing toward the second end.

Example 11 includes the dual-valve assembly of any of Examples 1-10, wherein the handle is composed of multiple layers of a same material bonded together.

Example 12 includes the dual-valve assembly of any of Examples 1-11, wherein the handle includes stainless steel.

Example 13 is a handle including a body having a first end and a second end opposite the first end. The first end has a first tab with a first opening and a second tab with a second opening. Each of the first and second openings is configured to receive a rotatable component. The handle includes a flexible arm coupled to and extending from the body. The flexible arm has a first portion and a second portion. The first portion has a first end and a second end opposite the first end. The first end of the first portion is connected to the second portion by a bend. The bend is sized to fit within a notch to prevent rotation of the handle. When the second end of the first portion is moved toward the body, the bend of the flexible arm is pivoted away from the body to permit rotation of the handle.

Example 14 includes the handle of Example 13, wherein the body including an opening. When an object is inserted into the opening, the second end of the flexible arm is limited from moving toward the body.

Example 15 includes the handle of Examples 13 or 14, wherein the handle includes a protrusion extending from the body to limit the bend from being moved toward the body, Example 16 includes the handle of any of Examples 13-15, further including a shield coupled to the body. The shield surrounds at least a portion of the flexible arm to limit the flexible arm from being moved laterally relative to the body.

Example 17 includes the handle of any of Examples 13-16, wherein the body and the flexible arm are constructed as a single unitary part.

Example 18 is a method including printing, via a three-dimensional (3D) printer, a handle including a body having a first end and a second end opposite the first end. The first end has a first tab with a first opening and a second tab with a second opening. Each of the first and second openings configured to receive a rotatable component. The handle also includes a flexible arm extending from the body. The flexible arm has a first portion and a second portion. The first portion has a first end and a second end opposite the first end. The first end of the first portion is connected to the second portion by a bend. The bend sized to fit within a notch to prevent rotation of the handle. When the second end of the first portion is moved toward the body, the bend of the flexible arm is pivoted away from the body to permit rotation of the handle.

Example 19 includes the method of Example 18, wherein the 3D printer is a powder bed fusion machine.

Example 20 includes the method of Examples 18 or 19, wherein the handle is printed from stainless steel.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A handle comprising:
a body having a first end and a second end opposite the first end, the first end having a first tab with a first opening and a second tab with a second opening, each of the first and second openings configured to receive a rotatable component; and
a flexible arm coupled to and extending from the body, the flexible arm having a first portion and a second portion, the first portion having a first end and a second end opposite the first end, the first end of the first portion connected to the second portion by a bend, the bend sized to fit within a notch to prevent rotation of the handle, and wherein, when the second end of the first portion is moved toward the body, the bend of the flexible arm is pivoted away from the body to permit rotation of the handle.

2. The handle of claim 1, wherein the body has a third opening, wherein when an object is inserted into the third opening, the second end of the flexible arm is limited from moving toward the body.

3. The handle of claim 2, wherein the third opening is adjacent the second end of the body.

4. The handle of claim 2, wherein the flexible arm includes a tab extending from the first portion of the flexible arm toward the body, the tab to engage the object when the object is inserted into the third opening.

5. The handle of claim 4, wherein the body defines a channel, and wherein the tab extends into the channel of the body.

6. The handle of claim 4, wherein the tab is a first tab, the flexible arm including a second tab extending from the first portion of the flexible arm toward the body, the second tab spaced apart from the first tab.

7. The handle of claim 4, wherein the body includes a first wall and a second wall spaced from the first wall, the third opening formed in the first wall, the body having a fourth opening formed in the second wall and aligned with the third opening.

8. The handle of claim 7, wherein, when the flexible arm is in a relaxed state, the tab is disposed between the third and fourth openings.

9. The handle of claim 1, further including a protrusion extending from the body to limit the bend from being moved toward the body.

10. The handle of claim 1, further including a shield coupled to the body, the shield surrounding at least a portion of the flexible arm to limit the flexible arm from being moved laterally relative to the body.

11. The handle of claim 1, wherein the flexible arm includes four portions connected by bends, such that the flexible arm has an M-shaped profile.

12. The handle of claim 1, wherein the body defines a channel, the flexible arm coupled to the body in the channel, and wherein at least a portion of the flexible arm is in the channel, and at least a portion of the flexible arm is outside of the body.

13. The handle of claim 1, wherein an area on the first portion near the second end is enlarged to enable a person to press the area and move the second end toward the body.

14. The handle of claim 1, wherein the body includes an arrow pointing toward the second end.

15. The handle of claim 1, wherein the body and the flexible arm are constructed as a single unitary part.

16. The handle of claim 15, wherein the body and the flexible arm are composed of multiple layers of a same material bonded together.

17. The handle of claim 16, wherein the body and the flexible arm include stainless steel.

\* \* \* \* \*